(12) United States Patent
Mills et al.

(10) Patent No.: US 10,970,052 B2
(45) Date of Patent: Apr. 6, 2021

(54) SYSTEM AND METHOD FOR ENHANCING COMPONENT BASED DEVELOPMENT MODELS WITH AUTO-WIRING

(71) Applicant: Oracle International Corporation, Redwood Shores, CA (US)

(72) Inventors: Duncan Richard Mills, Winchester (GB); Ondřej Vrabec, Prague (CZ); Antonín Nebuželský, Průhonice (CZ)

(73) Assignee: Oracle International Corporation, Redwood Shores, CA (US)

( * ) Notice: Subject to any disclaimer, the term of this patent is extended or adjusted under 35 U.S.C. 154(b) by 231 days.

(21) Appl. No.: 16/206,363

(22) Filed: Nov. 30, 2018

(65) Prior Publication Data
US 2020/0125336 A1 Apr. 23, 2020

Related U.S. Application Data

(60) Provisional application No. 62/747,909, filed on Oct. 19, 2018.

(51) Int. Cl.
| | | |
|---|---|---|
| *G06F 8/35* | (2018.01) | |
| *G06F 8/36* | (2018.01) | |
| *G06F 8/20* | (2018.01) | |
| *G06F 8/41* | (2018.01) | |
| *G06F 8/38* | (2018.01) | |

(52) U.S. Cl.
CPC ............. *G06F 8/35* (2013.01); *G06F 8/20* (2013.01); *G06F 8/36* (2013.01); *G06F 8/38* (2013.01); *G06F 8/43* (2013.01)

(58) Field of Classification Search
CPC ..... G06F 8/20; G06F 8/35; G06F 8/36; G06F 8/38; G06F 8/43; G06F 8/10–38
USPC .................................................. 717/101–109
See application file for complete search history.

(56) References Cited

U.S. PATENT DOCUMENTS

| | | | | |
|---|---|---|---|---|
| 8,806,430 B1 * | 8/2014 | Bienkowski | .......... | G06F 40/166 717/113 |
| 9,851,953 B2 * | 12/2017 | Straub | .......... | G06F 8/34 |
| 10,534,603 B1 * | 1/2020 | Johnson | .......... | G06F 3/0482 |
| 10,698,668 B1 * | 6/2020 | Pohlack | .......... | G06F 21/572 |

(Continued)

OTHER PUBLICATIONS

Developing Applications with Oracle Visual Builder in Oracle Integration, last retrieved from https://docs.oracle.com/en/cloud/paas/integration-cloud/visual-developer/service-data-provider.html on Sep. 13, 2020 (Year: 2018).*

*Primary Examiner* — Andrew M. Lyons
(74) *Attorney, Agent, or Firm* — Kilpatrick Townsend & Stockton LLP

(57) ABSTRACT

Techniques for component-based software engineering, and more particularly, to techniques for enhancing component based development systems by making components self-aware with respect to the applications that they may be consumed in or other peer components within the applications. An exemplary technique includes determining an addition of one or more components to an interface of an application; identifying an asset definition within metadata of a component of the one or more components added to the interface of the application, where the asset definition provides self-wiring or self-configuring instructions for an asset that needs to be created for the component within a predefined scope when the component is added to the interface; and creating the asset for the component based on the asset definition.

17 Claims, 10 Drawing Sheets

(56) References Cited

U.S. PATENT DOCUMENTS

| | | | | |
|---|---|---|---|---|
| 2005/0149868 A1* | 7/2005 | Katayama | ................ | G06F 8/38 |
| | | | | 715/700 |
| 2006/0074735 A1* | 4/2006 | Shukla | ................ | G06F 8/34 |
| | | | | 705/80 |
| 2006/0150148 A1* | 7/2006 | Beckett | ................ | G06F 8/34 |
| | | | | 717/109 |
| 2007/0094690 A1* | 4/2007 | Rodriguez | ................ | H04L 29/06 |
| | | | | 725/58 |
| 2008/0172660 A1* | 7/2008 | Arning | ................ | G06F 8/33 |
| | | | | 717/144 |
| 2009/0313601 A1* | 12/2009 | Baird | ................ | G06F 8/34 |
| | | | | 717/106 |
| 2012/0089933 A1* | 4/2012 | Garand | ................ | G06F 8/38 |
| | | | | 715/765 |
| 2012/0137268 A1* | 5/2012 | Dattke | ................ | G06F 8/33 |
| | | | | 717/105 |
| 2012/0192143 A1* | 7/2012 | Elaasar | ................ | G06F 8/74 |
| | | | | 717/104 |
| 2013/0132875 A1* | 5/2013 | Allen | ................ | G06F 3/04842 |
| | | | | 715/765 |
| 2015/0135166 A1* | 5/2015 | Tarlow | ................ | G06F 8/75 |
| | | | | 717/125 |
| 2017/0115968 A1 | 4/2017 | Fukala | | |
| 2019/0369969 A1* | 12/2019 | Donohoe | ................ | G06F 9/455 |

* cited by examiner

SYSTEM AND METHOD FOR ENHANCING COMPONENT BASED DEVELOPMENT MODELS WITH AUTO-WIRING

CROSS-REFERENCE TO RELATED APPLICATION

The present application claims the benefit and priority of Provisional Application No. 62/747,909, filed Oct. 19, 2018 entitled "SYSTEM AND METHOD FOR ENHANCING COMPONENT BASED DEVELOPMENT MODELS WITH AUTO-WIRING," the entire contents of which are incorporated herein by reference for all purposes.

FIELD OF THE INVENTION

The present disclosure relates generally to component-based software engineering, and more particularly, to techniques for enhancing component based development systems by making components self-aware with respect to the applications that they may be consumed in or other peer components within the applications.

BACKGROUND

Component based development is a branch of software engineering that emphasizes the separation of concerns with respect to the wide-ranging functionality available throughout a given software system. Specifically, component based development is a reuse-based approach to defining, implementing and composing loosely coupled independent components into systems. The component based systems are used as basic building blocks of applications (including, but not restricted to user interface applications such as those for web or mobile use). This practice aims to bring about an equally wide-ranging degree of benefits in both the short-term and the long-term for the software itself and for organizations that sponsor such software.

Software engineering practitioners regard components as part of the starting platform for service-orientation. Components play this role, for example, in web services, and more recently, in service-oriented architectures (SOA), whereby a component is converted by the web service into a service and subsequently inherits further characteristics beyond that of an ordinary component. An individual component is a software package, a web service, a web resource, or a module that encapsulates a set of related functions (or data). All system processes are placed into separate components so that all of the data and functions inside each component are semantically related (just as with the contents of classes). Because of this principle, it is often said that components are modular and cohesive.

With regard to system-wide co-ordination, components communicate with each other via interfaces. When a component offers services to the rest of the system, it adopts a provided interface that specifies the services that other components can utilize, and how they can do so. This interface can be seen as a signature of the component and the client does not need to know about the inner workings of the component (implementation) in order to make use of it. This principle results in components referred to as encapsulated. However, when a component needs to use another component in order to function, it adopts a user interface that specifies the services that it needs. Another important attribute of components is that they are substitutable, so that a component can replace another (at design time or run-time), if the successor component meets the requirements of the initial component (expressed via the interfaces). Consequently, components can be replaced with either an updated version or an alternative without breaking the system in which the component operates.

Components often take the form of objects or collections of objects (from object-oriented programming), in some binary or textual form, adhering to some interface description language (IDL) so that the component may exist autonomously from other components in a computer. In other words, a component acts without changing its source code. Although, the behavior of the component's source code may be change based on the application's extensibility, provided by its writer. When a component is to be accessed or shared across execution contexts or network links, techniques such as serialization or marshalling are often employed to deliver the component to its destination. Reusability is an important characteristic of components. Programmers typically design and implement software components in such a way that many different programs can reuse them.

However, conventional use of components treats them as stand-alone isolated units with only limited use of engineered templating or special case coding to enhance the user experience and convenience of consuming them. For example, in traditional component based models the capabilities of the component are defined by its application programming interface (API), traditionally framed in terms of the properties it supports, any public methods, and any events that it emits. This allows the components to be portable and testable. Nonetheless, this means that consumers of components are ultimately responsible for performing all of the wiring or configuration of the component at the point of consumption. Therefore, methods and systems for enhancing component based development systems is desired.

BRIEF SUMMARY

Techniques are provided (e.g., a method, a system, non-transitory computer-readable medium storing code or instructions executable by one or more processors) for enhancing component based development systems by making components self-aware with respect to the applications that they may be consumed in or other peer components within the applications.

In various embodiments, a method is provided for that includes receiving, at a data processing system, a request for modifying a view of an application, where the modification of the view includes a modification of at least component of the view; receiving, by the data processing system, self-wiring or self-configuring instructions from the component; updating, by the data processing system, an application data model based on the self-wiring or self-configuring instructions; and communicating, by the data processing system, the updated application data model to a server system.

In various embodiments, a method is provided for that includes determining, by a data processing system, an addition of one or more components to an interface of an application; identifying, by the data processing system, an asset definition within metadata of a component of the one or more components added to the interface of the application, where the asset definition provides self-wiring or self-configuring instructions for an asset that needs to be created for the component within a predefined scope when the component is added to the interface; and creating, by the data processing system, the asset for the component based on the asset definition.

In various embodiments, a method is provided for that includes determining, by a data processing system, an addition of one or more components to an interface of an application; identifying, by the data processing system, an asset definition within metadata of a component of the one or more components added to the interface of the application, where the asset definition provides self-wiring or self-configuring instructions for an asset that needs to be created for the component within a predefined scope when the component is added to the interface; determining, by the data processing system, whether a requested name of the asset is already used in the predefined scope; when the requested name is not already used in the predefined scope, setting, by the data processing system, the requested name as the assigned name of the asset; when the requested name is already used in the predefined scope, generating, by the data processing system, a new name as the assigned name of the asset; and creating, by the data processing system, the asset for the component with the assigned name based on the asset definition.

In some embodiments, the self-wiring or self-configuring instructions from the component define a variable, type, action chain, or listener to be created when the component is added into the interface of the application.

In some embodiments, the self-wiring or self-configuring instructions from the component define a variable of type Service Data Provider to be created when the component is added into the interface of the application, and the variable needs to be created along with transformations.

In some embodiments, the method further includes determining, by the data processing system, whether the asset is defined with a context key in the asset definition; when the asset is not defined with a context key, determining, by the data processing system, whether the requested name of the asset is already used in the predefined scope; when the asset is defined with a context key, determining, by the data processing system, whether there is a matching context key for the interface; and when there is no matching context key for the interface, determining, by the data processing system, whether the requested name of the asset is already used in the predefined scope.

In some embodiments, when there is a matching context key for the interface, the creating, by the data processing system, the asset comprises associating the asset with an existing asset definition linked with the context key rather than creating the asset for the component with the assigned name based on the asset definition.

In some embodiments, the method further includes determining, by the data processing system, the addition of another component to the interface; identifying, by the data processing system, another asset definition within metadata of the another component added to the interface, where the another asset definition provides information about another asset that needs to be created for the another component; determining, by the data processing system, the another asset is defined with the context key in the another asset definition; and creating, by the data processing system, the another asset by associating the another asset with an existing asset definition linked with the context key.

In some embodiments, the data processing system is part of an integrated development environment, and the component is a reusable piece of UI that can be embedded as a custom HTML element in the application.

In various embodiments, a system is provided for that includes a data processing system that includes one or more processors and non-transitory machine readable storage medium having instructions stored thereon that when executed by the one or more processors cause the one or more processors to perform a process comprising: determining an addition of one or more components to an interface of an application; identifying an asset definition within metadata of a component of the one or more components added to the interface of the application, wherein the asset definition provides self-wiring or self-configuring instructions for an asset that needs to be created for the component within a predefined scope when the component is added to the interface; determining whether a requested name of the asset is already used in the predefined scope; when the requested name is not already used in the predefined scope, setting the requested name as the assigned name of the asset; when the requested name is already used in the predefined scope, generating a new name as the assigned name of the asset; and creating the asset for the component with the assigned name based on the asset definition.

In some embodiments, the self-wiring or self-configuring instructions from the component define a variable, type, action chain, or listener to be created when the component is added into the interface of the application.

In some embodiments, the self-wiring or self-configuring instructions from the component define a variable of type Service Data Provider to be created when the component is added into the interface of the application, and the variable needs to be created along with transformations.

In some embodiments, the process further includes determining whether the asset is defined with a context key in the asset definition; when the asset is not defined with a context key, determining whether the requested name of the asset is already used in the predefined scope; when the asset is defined with a context key, determining whether there is a matching context key for the interface; and when there is no matching context key for the interface, determining whether the requested name of the asset is already used in the predefined scope.

In some embodiments, when there is a matching context key for the interface, the creating the asset comprises associating the asset with an existing asset definition linked with the context key rather than creating the asset for the component with the assigned name based on the asset definition.

In some embodiments, the process further includes determining the addition of another component to the interface; identifying another asset definition within metadata of the another component added to the interface, where the another asset definition provides information about another asset that needs to be created for the another component; determining the another asset is defined with the context key in the another asset definition; and creating the another asset by associating the another asset with an existing asset definition linked with the context key.

In some embodiments, the data processing system is part of an integrated development environment, and the component is a reusable piece of UI that can be embedded as a custom HTML element in the application.

In various embodiments, a non-transitory machine readable storage medium is provided having instructions stored thereon that when executed by one or more processors cause the one or more processors to perform a method comprising: determining an addition of one or more components to an interface of an application; identifying an asset definition within metadata of a component of the one or more components added to the interface of the application, wherein the asset definition provides self-wiring or self-configuring instructions for an asset that needs to be created for the component within a predefined scope when the component is added to the interface; determining whether a requested name of the asset is already used in the predefined scope; when the requested name is not already used in the predefined scope, setting the requested name as the assigned name of the asset; when the requested name is already used in the predefined scope, generating a new name as the assigned name of the asset; and creating the asset for the component with the assigned name based on the asset definition.

In some embodiments, the self-wiring or self-configuring instructions from the component define a variable, type, action chain, or listener to be created when the component is added into the interface of the application.

In some embodiments, the self-wiring or self-configuring instructions from the component define a variable of type Service Data Provider to be created when the component is added into the interface of the application, and the variable needs to be created along with transformations.

In some embodiments, the method further includes determining whether the asset is defined with a context key in the asset definition; when the asset is not defined with a context key, determining whether the requested name of the asset is already used in the predefined scope; when the asset is defined with a context key, determining whether there is a matching context key for the interface; and when there is no matching context key for the interface, determining whether the requested name of the asset is already used in the predefined scope.

In some embodiments, when there is a matching context key for the interface, the creating the asset comprises associating the asset with an existing asset definition linked with the context key rather than creating the asset for the component with the assigned name based on the asset definition.

In some embodiments, the method further includes determining the addition of another component to the interface; identifying another asset definition within metadata of the another component added to the interface, where the another asset definition provides information about another asset that needs to be created for the another component; determining the another asset is defined with the context key in the another asset definition; and creating the another asset by associating the another asset with an existing asset definition linked with the context key.

In some embodiments, the data processing system is part of an integrated development environment, and the component is a reusable piece of UI that can be embedded as a custom HTML element in the application.

The techniques described above and below may be implemented in a number of ways and in a number of contexts. Several example implementations and contexts are provided with reference to the following figures, as described below in more detail. However, the following implementations and contexts are but a few of many.

DETAILED DESCRIPTION

Figure 1:
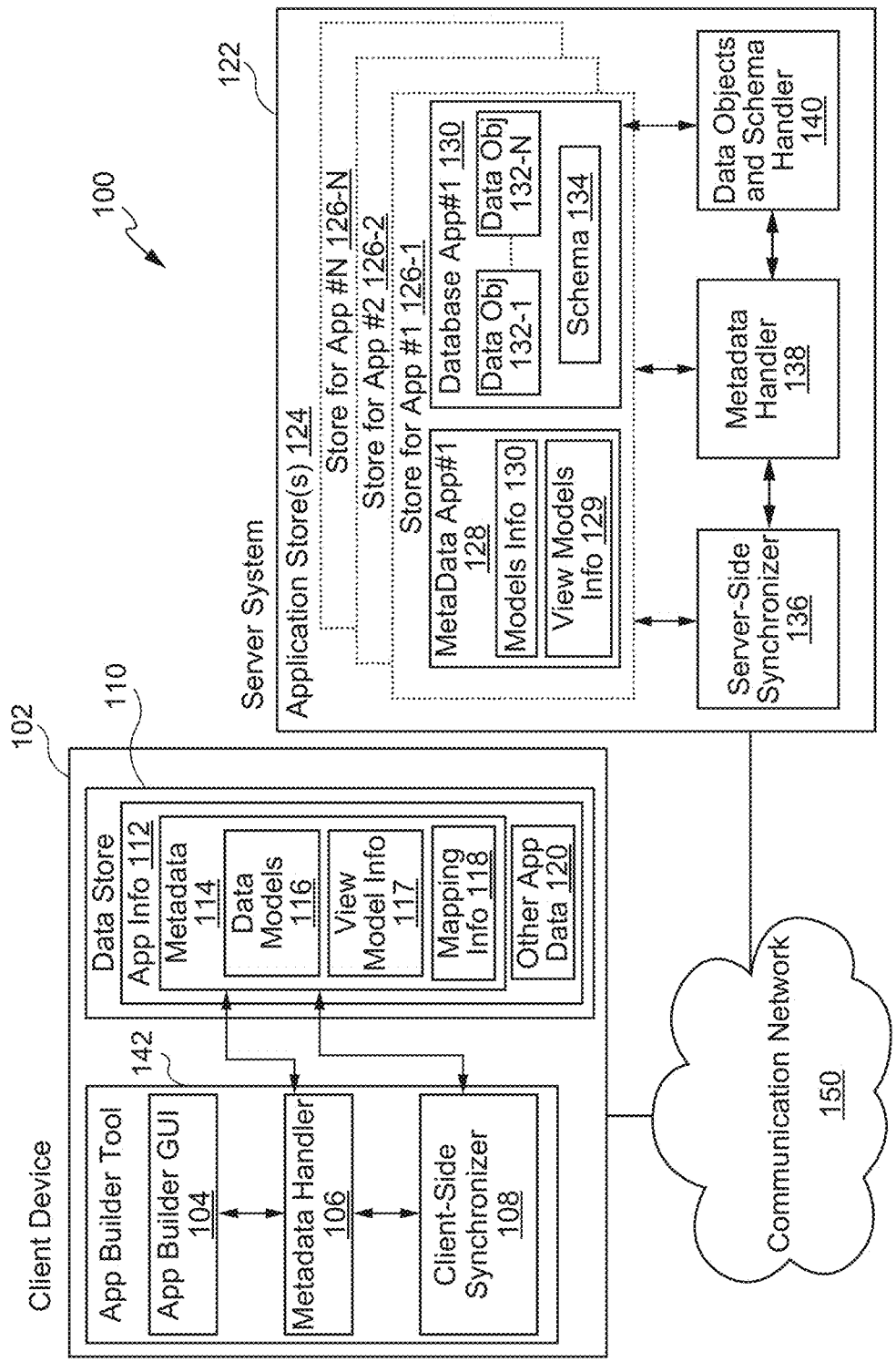
FIG. 1 shows a simplified block diagram of a distributed application development platform for facilitating a user to build an application in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Introduction

An integrated development environment (IDE) is a software application that provides comprehensive facilities to computer programmers for software development. For example, Oracle Visual Builder Cloud Service (Oracle VBCS) is a cloud-based IDE Platform as a Service (PaaS) and a hosted environment for application development infrastructure. The Oracle VBCS provides an open-source standards-based solution to develop, collaborate on, and deploy applications within Oracle Cloud. Users can visually create an application using a collection of built-in user-interface controls, and bind the user interface (UI) to existing REST services or custom business objects they create from within the tool. Users publish created applications with a click of a button to provide access to end-users. In addition role based security can be defined for the applications to control access to pages and data.

Traditionally, IDEs that include a visual development approach such as Oracle VBCS have been an attractive solution to developers who leveraged the no-code required nature of the platforms to build their custom applications. However, many professional developers also expressed interest in the visual development experience they saw, but they were looking for additional capabilities. Specifically developers were demanding an option to have direct access to the code that the visual tools created so they can change it and enhance it with their own custom code to achieve richer behaviors. With the newer IDEs these demands were addressed by adding direct access to manipulate code, while keeping the low-code characteristics of traditionally IDEs that include a visual development approach. Just like in the traditionally IDEs, constructing the UI is done through a visual "what you see is what you get" (WYSIWYG) layout editor. Additionally, users have access to a much richer set of UI components in the component palette. As used herein, a "component" or "web component" is a reusable piece of UI that can be embedded as a custom HTML element in an application and can be composed of other Web Components, JET components, HTML, SVG, JavaScript, and CSS. The Composite Component Architecture (CCA) provided in Oracle JET follows much of the developing W3C specification, as it currently stands, and provides a simplified way of creating custom HTML components for use in such IDEs.

The visual editor of IDEs may include a means (e.g., a "Code" button or tab) that provides developers direct access to the code such as HTML/JavaScript/CSS based code that makes up the page layout, which allows developers to leverage their existing expertise to further enhance and customize the applications. Developers can directly manipulate the code through the smart code editor leveraging features such as code insight, syntax highlighting, doc access, and reformatting directly in their browser. This visual development approach is not limited to page layouts. The visual editor may also extend enrichment of the application also to the way developers can define business logic. Defining the flow of the logic may be done through a flow editor. With a collection of operations that a developers can define in a declarative way, and the ability to invoke specific JavaScript code for unique functionality. Moreover, now that developers have direct access to the code, supplementary functionality such as data integration, could be added with programs such as Git (e.g., Oracle Developer Cloud Service uses Git source control management to save and manage application source code files). For example, leveraging the private Git repositories provided through Oracle Developer Cloud Service (DevCS), development teams can now utilize a full set of agile methodology capabilities of DevCS when working on Oracle VBCS applications, including issue tracking, version management, agile planning and code review processes.

However, in these newer IDEs such as Oracle VBCS, components are treated as stand-alone isolated units with only limited use of engineered templating or special case coding to enhance the user experience and convenience of consuming them. This means that consumers of components such as developers are responsible for performing all of the wiring at the point of consumption. The various embodiments described herein take away a large portion of this fix up work in a way that ensures the components are still loosely coupled and not solely confined to use with one development tool or environment. Specifically, the concepts covered by these various embodiments are techniques for pre-seeding component dependencies, providing pre-configured "serving suggestions" as to how the components are likely to be used, and a mechanism for helping related components self-organize into coordinated models without the consumer developer having to intervene. All of this is done in a generic fashion whereby the IDE or development environment does not need to be extended or specially coded to recognize and treat given components in a special way.

Integrated Development Environment

FIG. 1 shows a simplified block diagram of a distributed application development platform 100 (e.g., Oracle VBCS) for facilitating a user to build an application in accordance with various embodiments. As shown, application development platform 100 can include a client device 102, a server system 122, and/or any other components. Development platform 100 depicted in FIG. 1 is merely an example and is not intended to unduly limit the scope of various embodiments recited in the claims. One of ordinary skill in the art would recognize many possible variations, alternatives, and modifications. For example, in some implementations, platform 100 may have more or fewer components than those shown in FIG. 1, may combine two or more components, or may have a different configuration or arrangement of components. For example, while only client device 102 is depicted in FIG. 1 for purposes of simplicity, multiple client devices may be present in other embodiments.

In the example depicted in FIG. 1, the client device 102 and the server system 122 are communicatively coupled to each other via communication network 150. Communication network 150 can be of various different types including but not limited to the Internet, an intranet, a local area network (LAN), a wide area network (WAN), and the like. One or more communication protocols may be used to facilitate communications using communication network 150 including various wired and wireless communication protocols.

In the distributed embodiment depicted in FIG. 1, a user can build an application by designing a user interface for the application using client device 102. As the user build the application user interface, changes made by the user may results a change to the view structure of the application. Changes to the view structure of the application may in turn trigger changes to the data model for the application. Information (e.g., metadata) indicative of the changes to the view and data models for the application are then propagated to the server system from the client device. At the server system, the changes may result in automatic updates to the data objects for the application. For example, if the data objects are implemented using a remote service, the application may be updated with all of the metadata required to access and map the data from that service.

A client device 102 can be a desktop computer, a laptop computer, a smartphone, a tablet computer, and/or any other type of client device. As shown, the client device 102 may be configured to provide an application builder tool 142 that enables a user of client device 102 to build and edit one or more applications according to the teachings of the present disclosure. An example of such a tool is Oracle VBCS, which may be provided as part of the Oracle Application Builder Cloud Service (ABCS) provided by Oracle® Corporation. ABCS is a cloud offering (offered as a Software as a Service (SaaS)) which enables business users to rapidly create and host web applications without writing code and with no programming experience. Users can assemble an application using a collection of built-in user-interface controls, and bind the UI to existing REST services or custom business objects they create from within the tool. ABCS empowers business users to develop customized application solutions without relying on busy IT professionals. The client device 102 may include one or processors and memory resources. In the example depicted in FIG. 1, the memory resources include a memory repository 110 that may be configured to store data related to applications that can be built and/or edited using application builder tool 142.

In the embodiment depicted in FIG. 1, application builder tool 142 comprises multiple modules including an application builder graphical user interface (application builder GUI) module 104, a metadata handler module 106, a client synchronizer module 108 and/or any other components. These modules may be implemented in software (e.g., code, instructions, programs executable by one or more processors of client device 102) or hardware, or combinations thereof. The application builder graphical user interface 104 provides an interface that enables a user of client device 102 to interact with application builder tool 142. The application builder graphical user interface 104 may provide various components that a user can select for building an application. Examples of such components can include components corresponding to a list, a graph, a media element (e.g., a picture or movie clip), a link, a calendar, an input box, a dropdown menu, a footer, a header, a description box, a text box or area, a window, a button, a table, and other UI components. Application builder GUI 104 may provide an area, for example, a canvas area, where the user can put together one or more selected UI components to build a user interface for an application and create the application.

Figure 2A:
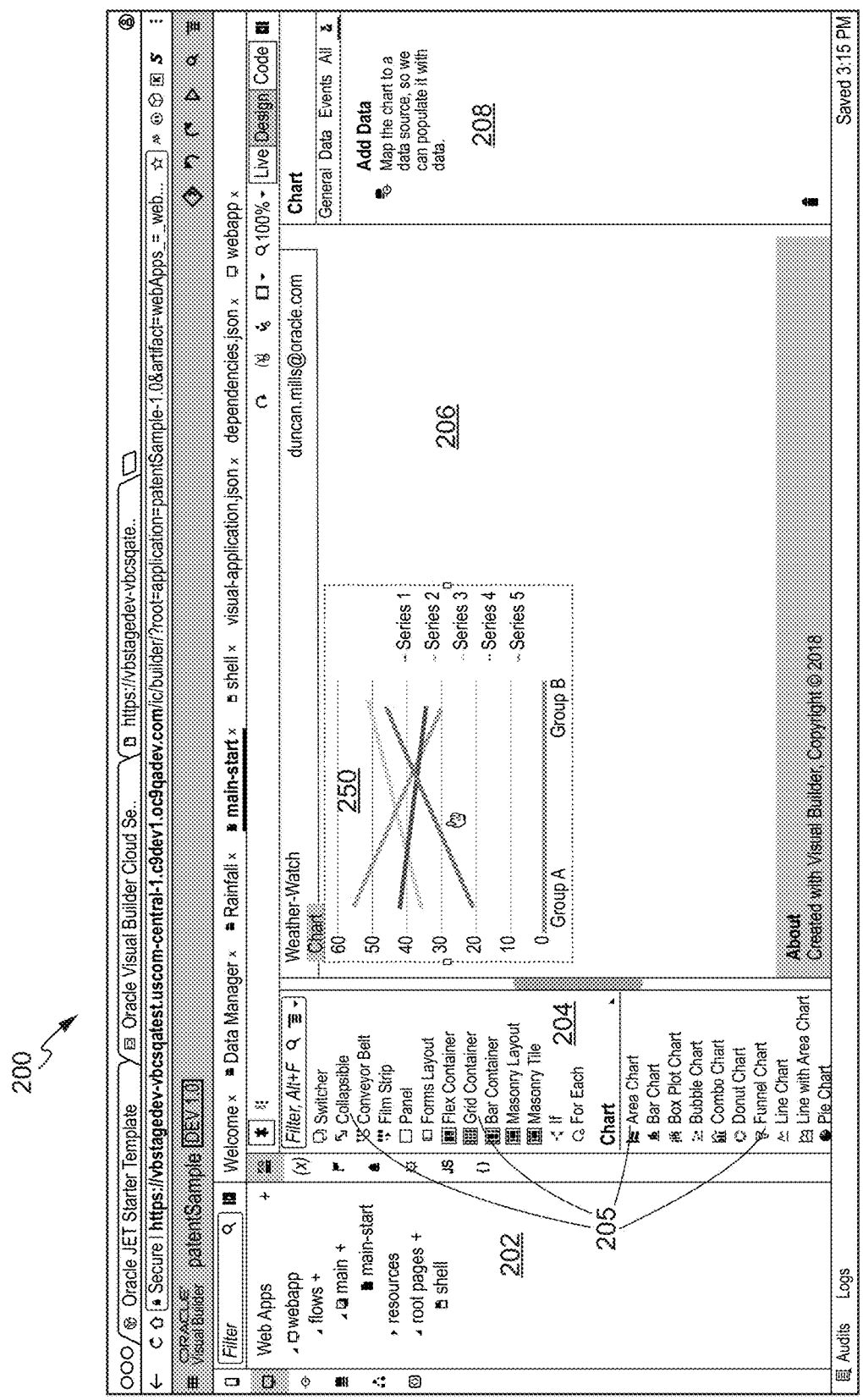
FIGS. 2A-2D show examples of an application builder GUI in accordance with various embodiments.

FIG. 2A shows an example of an application builder GUI 200 that may be displayed by the client computing device 102. In one embodiment, the application builder GUI 200 is implemented through a web browser on the client device 102. In the example depicted in FIG. 2A, the application builder GUI 200 comprises a toolbar 202, a palette area 204 displaying multiple user-selectable UI components 205, a canvas 206 for building the UI for an application, a property inspection panel 208 and/or any other components. Application builder GUI 200 enables a user to build an application simply by building a user interface for the application using one or more UI components 205 provided by application builder GUI 200.

As shown in the example in FIG. 2A, the components 205 may be organized according to their types such as "Common," "Field," "Collection," and the like. Various other types may be provided in alternative embodiments. A user may build a user interface for an application by selecting a component from palette area 204 and then adding it to the UI for the application being built by dragging and dropping the selected component into canvas area 206. Various different types of components may be made available in application builder UI 200 by application builder tool 142 such as, without limitation, layout components, media components, custom components, and/or any other types of components. Layout components may include containers for organizing other UI components on canvas 206. Examples of layout components can include tabs, panels, and/or any other types of layout components. Media components can be used to add images to the UI being designed in canvas 206. When the user drags and drops a media component onto canvas 206, the user may be prompted to select a location where the actual media file can be found.

Canvas 206 provides an area where the user can design the user interface for an application being built. In some implementations, canvas 206 may include a pre-defined layout grid of columns and rows to facilitate aligning of GUI components when the user positions them on canvas 206. In certain embodiments, when the user drags and drops a component onto the canvas 206, one or more of the existing components on canvas 206 may be resized to accommodate the newly added UI component. In certain embodiments, area 208 is used for displaying information regarding a selected component. For example, when a component is selected in palette area 204, information regarding the selected component may be displayed in area 208. As another example, when a component is selected in the canvas area 206, information regarding the selected component may be displayed in area 208.

Application builder tool 142 enables a user to build a fully functioning executable application by simply building the UI for the application and without having to worry about the data model for the application or about the data objects that are needed for making the application functional and executable. For example, a user may select, from palette area 204, a component to be included in the UI for the application being built, and then drag the selected component from palette area 204 and drop it into canvas 206. The user may reposition the component within canvas 206 if needed. Additional components may be selected and added to the canvas area 206 as desired by the user. As the user adds components to the application's UI, the data model associated with the application is automatically created and/or updated, which in turn causes the data objects for the application to be automatically created and/or updated and to be wired or bound to the components, as explained below in further detail herein.

Figure 2B:
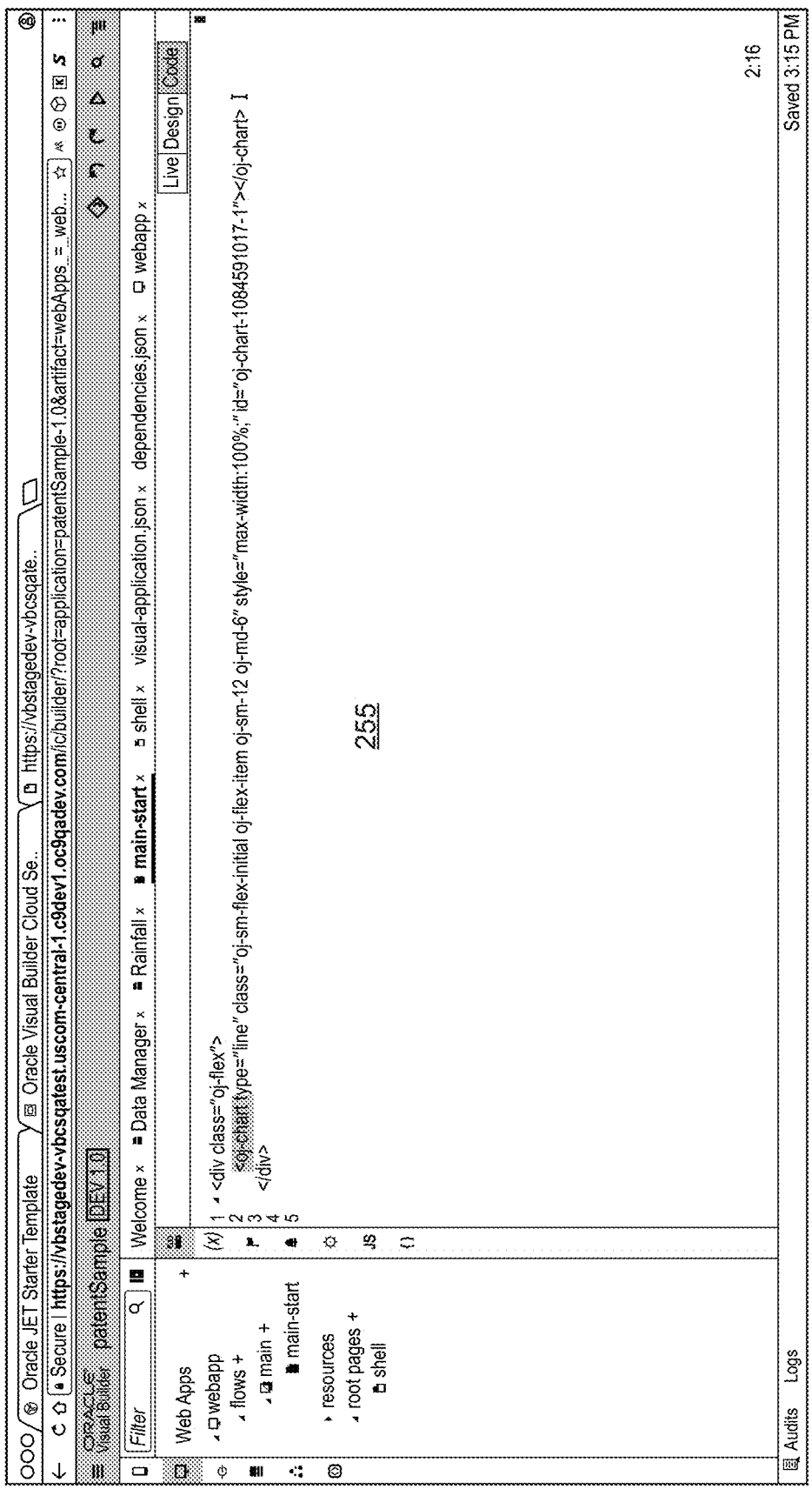

In the example depicted in FIG. 2A, application builder GUI 200 may include one or more components 250 that can be added to a canvas area 206 for constructing a UI of an application. The components 250 are reusable components that are generic and intended for use with any number of data sets, logic, connections, etc. As shown in FIG. 2B, the addition of a component 205 to the canvas area 206 causes code 255 to be written by the visual editor that prewires or configures the component 250 for use in the UI of the application. However, as shown in code 255, the component 250 is not prewired or configured to run with any data, logic, connections, etc. Instead, the application builder GUI 200 leaves it up to the developer to wire or configure the component 250 to run with data, logic, connections, etc. in order to provide a specific functionality or a service to the UI of the application (e.g., display rainfall data for the past year from a weather service).

In conventional IDEs, for more complex components such as graphs or charts as compared to text boxes, the visual editor may provide a default set-up (e.g., default data to show what a chart may look like upon configuration) and/or a wizard or walk-through tutorial to the developer that assists the developer in wiring or configuring the component 250 to run with data, logic, connections, etc. However, it is to be understood that default set-up and/or wizard or walk-through tutorial are provided by the IDE or application builder (not the component itself) to assist in the wiring or configuration of the component, and in contrast the component is not self-wiring or self-configuring and instead is relying on input of the developer that is prompted by a wizard or configuration program of the visual editor. This ultimately requires the IDE or application builder to be very knowledgeable about the component in order to allow for assistance with the wiring or configuration of the component (i.e., a programmer of the IDE needs to code a wizard or walk-through tutorial for each complex component, which can be time consuming and costly, especially for component that may be dynamic or constantly being updated).

Figure 2C:
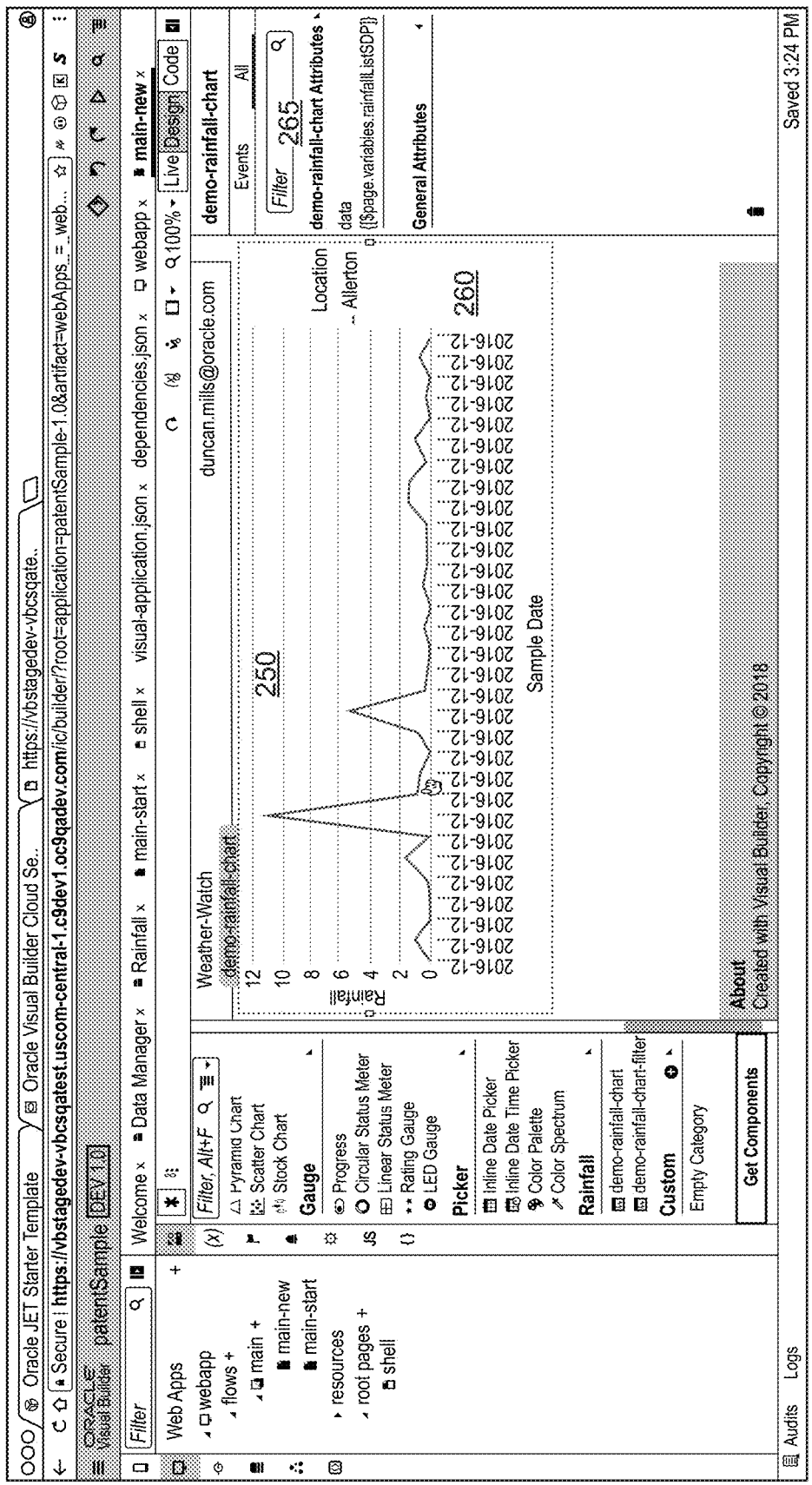
Figure 2D:
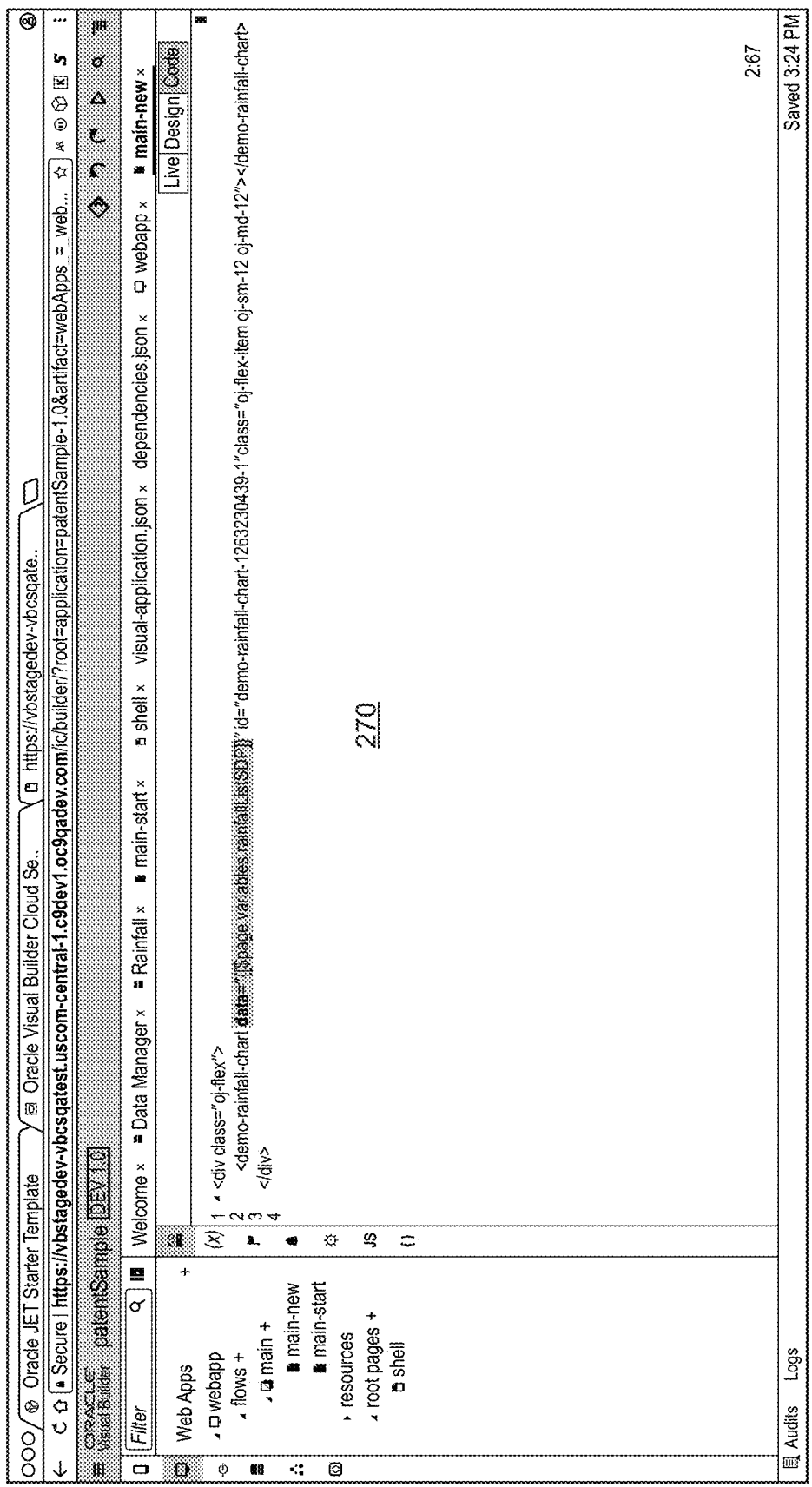

In various embodiments, to allow this level of wiring or configuration of a component without having the IDE or application builder to be very knowledgeable about the component, the components are developed with metadata or a map of how to self-wire or self-configure for use with the UI of the application. As shown in FIG. 2C, when the component 250 is developed with metadata or a map of how to self-wire or self-configure, and subsequently added by a consuming developer to the canvas area 206 for constructing a UI of an application, the component 250 is automatically wired to retrieve data 260 from a source and apply a filter 265 based on the contents of the metadata. As shown in FIG. 2D, the addition of a component 250 to the canvas area 206 causes enhanced code 270 to be written by the visual editor that not only prewires or configures the component 105 for use in the UI of the application but also wires or configures the component 250 to retrieve data 260 from a source and apply a filter 265 based on the contents of the metadata, as described in detail herein.

Referring back to FIG. 1, information related to the application being built may be stored in a memory repository 110 of client device 102 as application information 112. Information for one or more applications may be stored. The application information 112 for an application may include application metadata 114 and other application data 120. The application metadata 114 for an application may include view model information 117, information 116 for a data model for the application, and mapping information 118 mapping components from the view model to data objects in the data model. In certain embodiments, the view model information 117 may include a view structure of the application identifying the various UI components that are part of the application view and relationship between the UI components. In certain embodiments, an application may have a tree-like view structure rooted at a root component with a hierarchical relationship between the UI components included in the application's user interface. The view structure may be updated as changes are made to the application's user interface by the user.

As previously indicated, the data model information 116 for an application identifies the organization of data for the application. The data model may identify the data objects to be created for the application. A data model for an application can be implemented as a repository for querying or manipulating a structure of business objects or entities. In certain implementations, a given data model may include one or more objects or entities that are associated with components in the application. For example, when the user drags and drops the chart UI component 250 to the canvas 206, as shown in FIG. 2A, information indicative of a data object for a chart may be automatically added to the data model for the application. The data model information may subsequently be used to actually create the data object. The data objects included in the data model for an application may be automatically determined from the components included in the view structure of the application and the hierarchical relationships between the components that are also reflected in the view model. In certain embodiments, mapping information 118 includes information identifying mappings between the components in the view model for the application and the data objects identified in the data model for the application. The mapping information 118 is used to automatically and dynamically create bindings between the components for the application and the data objects for the application.

As described above, a user builds an application simply by building the user interface for the application using one or more UI components provided by the application builder tool. Accordingly, when a view of an application is modified by a consumer, information indicative of the view modification may be received by the application builder tool 142 executing on the client device. In the example depicted in FIG. 1, application builder GUI module 104 of application builder tool 142 is configured to receive information indicating whether a user has made a change to the view of the application. Various different actions performed by the consumer may cause a change or modification to the view of the application. For example, the view of the application may be changed when the consumer adds a new UI component to the user interface for the application. For example, in FIG. 2A, when the consumer selects and drags and drops a chart UI component 250 onto canvas area 206, this changes the view of the application. Adding UI button components 205 also changes the view of the application. Changing an asset of a UI component that is already part of the user interface for the application may also change the view of the application.

When a view of an application is modified by a consumer, an application data model may be updated based on the view change received. As described above, the change received at can cause the data model associated with the application to change. The metadata of the application stored on the client device may be updated to reflect and store the changes in the data model. As described above, the data model for the application represents a structure of data for the application. For example, when UI table component "Task List" is added to the application, the data model for the application may be changed by adding a business object corresponding to the table component. Further, when columns of the table UI component are changed or labels assigned to the columns (e.g., "Date" and "Description"), a business object "task list" corresponding to the table UI component in the data model may be added the data model to reflect these changes. This processing may be performed by metadata handler 106. Metadata handler 106 may receive information from application builder GUI 104 indicative of a change in the application's view. In response, metadata handler 106 may be configured to determine changes to the view model for the application. Based upon the changes to the view model, the metadata handler 106 maybe further configured to determine changes to the data model for the application. The metadata handler 106 may make changes to the data model for the application by updating metadata 114 stored for the application on the client device for the application. For example, metadata handler 106 may update data model information 116 to reflect changes to the data model for the application.

In various embodiments, the updated data model may be communicated from the client device to a server system, such as from the client device 102 to the server system 122 shown in FIG. 1. For example, in the embodiment depicted in FIG. 1 the communication-related processing for sending updated data model information from client device 102 to server system 122 may be handled by client-side synchronizer 108. In certain embodiments, the client-side synchronizer 108 may be configured to communicate the updated data model information 116 to the server system 122 via serialized format such as a JavaScript Object Notification (JSON) file. The updated data model may be received at the server system 122. For example, in the embodiment depicted in FIG. 1, on the server side, the information from the client may be received and processed by server-side synchronizer module 136. In certain embodiments, the server-side synchronizer module 136 may send an acknowledgment to the client device indicating receipt of the updated data model information.

In certain embodiments upon receiving the information, the server-side synchronizer module 136 may be configured to store the received updated data model information in an application store 126 for the particular application. For example, as shown in FIG. 1, the server system 122 may include multiple application stores 124 corresponding to multiple applications being built using application builder tool 142. In one embodiment, the application store for an application may be created when the application is first created by a user on the client device. An application store for a particular application may store application metadata information 128 for the particular application. The application metadata information 128 may include information 129 related to a view structure of the particular application, information 130 related to the data model for the particular application, and other application information. In some implementations, the data model information stored on the server system 122 may be identical or similar to the corresponding data model information stored on the client device 102. Metadata information 128 can include mapping information for that application. As described above, the mapping information can indicate an association between a UI component and a corresponding data model object.

The application data model received may be processed by the server system 122. The processing may involve comparing the received data model with the application data model stored in application store on the server system 122, and determine a change of the data model based on the comparison. In certain embodiments, the processing may be performed by the server-side synchronizer 136 and the metadata handler 138 depicted in FIG. 1. In some embodiments, one or more data objects associated with the application may be updated as a result of a change to the data model for the application as detected. In the example depicted in FIG. 1, the processing may be performed by data objects and schema handler component module 140 depicted in FIG. 1. The data objects 132 for an application may be stored in a database 130. A schema 134 for the database may also be stored. The database 130 can include multiple data objects, such as data objects 132-1 to 132-N as shown, for the application.

In the example depicted in FIG. 1, the data objects and schema handler 140 may be configured to detect a change in a data model associated with a particular application based on the information received from a client device, such as the client device 102. For example, after receiving information indicating that a new business object has been added to the data model for the application due to the addition of table UI component "Table List" to the application's user interface, the data objects and schema handler 140 may be configured to detect this change and create and/or update data objects for the application. For data objects implemented using a database, the data objects may be created and/or updated by changing the database schema. As another example, if the number of columns in the table UI component is changed, the data objects and schema handler 140 may be configured to change the database schema 134 to add or delete columns of the table data object. Once the data model is processed, a response may be communicated to the client device 102 by the server system 122. The response communicated can indicate that the server system has processed the data model.

Self-Wiring or Self-Configuration of Components

The following examples describe various use cases and techniques outlined to solve auto-wiring issues in the use cases. The specific use cases and auto-wiring techniques are intended to be illustrative rather than limiting.

In various embodiments, a component has specific variable(s) created when the component is added into a page or application (e.g., via canvas area). There are two sub-use cases of automatic variable creation. The first is the basic task of creating a new variable in the required scope, with the correct name and associating it with one or more properties on the component tag as it written into the page by the distributed application development platform. The second is the case where some variable already exists with the correct name, scope and type and a developer wants the newly dropped component to "join" with that variable by having one or more properties bound to it in the dropped tag. This latter case facilitates component-to-component communication via a shared variable.

Variable Definition Metadata

In this simple example an auto-wiring contract is defined where a variable of type string is created and bound.

Sample component.json:

```
{
"name": "search",
"pack":"foo",
...
"properties": {
    "searchString":{
        "type":"string",
        "description":"Free text search expression",
        "writeback":"true",
```

-continued

Sample component.json:

```
        "extension":{
            "vbdt":{
                "value":"{{
                    $page.variables.@@fooSearch@@ }}",
            }
        }
    }
},
"extension": {
    "vbdt": {
        "assetDefinition":{ "$ref": "../extension/vbcs/
        fooSearchAssetDef.json",
    }
    }
}
}
```

Lines 1-2: Illustrate a fragment of a sample component called foo-search. Line 9: notice that the searchString property is marked as writable so in this case the auto-wiring template used in line 12 should generally reflect this and use the appropriate binding syntax in the generated UI for a writeable property, for example {{ . . . }} in some embodiments such as VBCS or Oracle JET applications if that's what the author wants. Line 12: Defines the value expression which will be assigned to this property asset in the created tag—this may be literal or may be a read-only or writable expression as in the example used in this case. The @@ . . . @@ marker defines the variable reference that will be substituted in. These expressions may be arbitrarily complex, however, any substitution markers should be defined within the main assetDefinition section (Line 19) otherwise they will not be resolvable. Line 19: The assetDefinition may be created in-line or, as in this case points to a separate metadata file loaded from a relative location within the component distribution, which contains the actual definitions (as shown below).

Sample fooSearchAssetDef.json

```
{
"":{
    "scope":{
        "page" : {
            "variables" : {
                "@@fooSearch@@": {
                    "type": "string",
                    "required": false,
                    "rateLimit": {
                        "timeout": 100
                    },
                    "input": "fromUrl",
                    "persisted":"none"
                }
            }
        }
    }
}
}
```

Line 2: The reason for this empty named outer element will become clear when context keys are discussed below. Lines 3-4: A developer can define containers for each of the available scopes for asset creation. This allows the definition file to define assets in each of those scopes as required functionally by the component. Most variable assets would be expected to be defined at page scope but that may not always be the case. Line 5: A section is provided for all the variable definitions available at this scope, as discussed herein, other asset types are also permissible. Line 6: The definition of a variable within one of these JSON fragments should map directly to the implementation within VBCS or similar development environment to ease the creation process for the custom component author and for ease of mapping in the distributed application development platform. The only difference is the actual name of the variable, which as mentioned above, might need to change if the suggested name clashes with a variable that is already defined in the scope. Note how the possibly variant name uses the enclosing @@ . . . @@ notation to match the reference to the variable elsewhere in the JSON (and in any HTML). The name for the variable indicated in the extension/vbcs/variable defined by the property in component.json should match one of the definitions within this assetDefinition file in order for the correct generated name of the variable to be patched into the property binding when the component is dropped into the UI. The distributed application development platform should create all the assets as indicated by the assetDefinition file. This will allow the creation of variables that are not directly bound to a UI property but which are needed for the functionality of the component.

In the above case when the component is dropped into the page the following logic is followed. Check to see if the same name is used in the requested scope. If the name is not already used then the assigned name for the artifact will be set to the requested name. If the name is already in use, then a new name will be generated to avoid collision e.g. fooSearch_1. This generated name will then be used as the assigned name. The artifact is created in the required scope with the assigned name. Additionally, the component tag UI fragment is created. Each property in the definition which has an extension.vbdt.value will be expressed as a specific asset on the tag and the physical value of that asset in the markup will reflect the value template used with any asset references resolved from the @@ . . . @@ version to the assigned name. So for example in this case it may be possible to end up with the following markup in the UI source code: <foo-search search-string="{{$page.variablesfooSearch_1}}"></foo-search>.

Type Definition Metadata

Because a custom component assetDefinition may be allowed to include variable definitions it follows that the auto-wiring capabilities should be extended to cover types (or interfaces) as well. Unlike variables, types would not be referenced directly from individual properties so they can be defined solely within the assetDefinition file. This will follow the same pattern as variables in the sense that types are qualified by a scope.
So to extend the example asset definition above to include a second variable and associated type definition:

Sample fooSearchAssetDef.json

```
{
    "":{
        "scope":{
            "page" : {
                "variables" : {
                    "@@fooSearch@@": {
                        "type": "string",
                        "required": false,
                        "rateLimit": {
                            "timeout": 100
```

```
                        },
                        "input": "fromUrl",
                        "persisted":"none"
                    },
                    "@@fooContext@@": {
                        "type":
                            "page:@@fooContextType@@"
                    }
                },
                "types": {
                    "@@fooContextType@@":{
                        "guid": "string",
                        "savedSearch": "string"
                    }
                }
            }
        }
    }
}
```

Line 15: The additional fooContext variable is defined here. Line 16: Because fooContext needs a type a reference to the name of a type defined within this same file is provided. Just like the variable case, when the type is physically created from the definitions here it's assigned name might turn out not to be simply fooContextType, it might end up as fooContextType_1. So the process of installing the assets will ensure that the actual reference created in the page metadata reflects the actual name of the type and of course the scope. For example, the page metadata might read as "fooContext": {"type": "pagefooContextType_1"}. Lines 20-22: The actual type definition again mirrors what a developer would see in the normal VBCS metadata.

The above examples may be amended to a more realistic use case where the fooContextType is actually re-used by many components and needs to be placed in application scope for re-use. Because this is re-used across several components it also may be defined as a separate file which can be shared. This also introduces the concept of a context key.

Sample fooSearchAssetDef.json

```
{
    "":{
        "scope":{
            "page" : {
                "variables" : {
                    "@@fooSearch@@": {
                        "type": "string",
                        "required": false,
                        "rateLimit": {
                            "timeout": 100
                        },
                        "input": "fromUrl",
                        "persisted": "none"
                    }
                }
            }
        }
    }
    "fooSharedContext key":{
        "scope": {
            "application":{
                "variables": {
                    "@@fooContext@@": {
                        "type":"application:
                            @@fooContextType@@"
                    }
                },
```

```
Sample fooSearchAssetDef.json

"types": {
        "@@fooContextType@@":
        {"$ref":"foo/fooshared/
extension/vbcs/assets/sharedDefintions.json#types/fooContextType"}
        }
    }
  }
}
```

Line 19: Everything defined in this section (lines 19-32) is going to be associated with the "fooSharedContext key" context key (discussed below). Line 21: A sub-tree has been introduced for assets that need to be created in application scope (flow scope will also be possible). Again the scope contains nodes for variables and types. Most programming languages and frameworks support the idea of scoping where variables functions and other assets have varying degrees of visibility to other parts of the program. These scopes are often referred to using terms such as "global" or "local". Within the VBCS development paradigm the same concept is used, it's just that the scopes are referred to as "application", "flow" and "page" but the inherent meaning and purpose of these is aligned with the common understanding of scope across all programming languages. Line 23: Accordingly, the definition for fooContext is now defined in this application scope rather than the original page scope. Line 24: A reference is still used to the fooContextType which again has moved to the application scope (so references in the runtime JSON will of course need to correctly reference the type according to the scope referencing syntax for the platform being illustrated in this example embodiment). Line 28: The definition of the fooContextType now uses an external reference to point to a shared definition in an external location where it can be referenced by multiple components. Note that the $ref points to both the source JSON file and the path to the required object within it.

The format of this JSON may be:

```
sharedDefintions.json

"types": {
        "@@fooContextType@@":{
            "guid": "string",
            "savedSearch": "string"
        }
    }
}
```

Note that this external reference makes no mention of the context key that fooContextType may be created in association with—that is defined by the asset definition that utilizes the type. There is a possibility that a single shared type might be used to create multiple variables in different context keys.

The problem being solved by context key is that of component-to-component auto-wiring. The de-facto way to link two components in data terms, is through the use of a shared variable that they can both read from and potentially write to. The problem is that when dropping two components onto the page, how can a framework achieve this coupling without the developer who is using the components having to know about the shared context variable and manually creating it. The context key provides this linkage.

If a variable is defined with no context key (i.e. is nested in the " ": { } section of the asset definition) then if two components are dropped onto the page that both require a string variable with the name, for example "baa" then, because there is no shared context, the first component would create and bind to a string variable called baa and the second component to be dropped would sense the collision with the existing baa variable and so create its variable as say baa_1 to avoid disrupting the existing definitions. If, on the other hand, both components provide a definition of a string variable baa with matching context keys then we are defining a shared contract. In this case the first component to be dropped would again create the string variable baa in the desired scope, and add the context key marker. However, this time, when the second component is dropped because of the match of variable name, type and context key the second component will not create a new variable baa_1 but instead will associate the property with the existing baa variable definition.

In various embodiments, the first component specifying a given context key with an asset will be the one that determines the name used. By default this would be the same as the name of the asset, however, as mentioned above, collision with an existing asset (that is not associated with the context key) would require that a unique name be generated and it would be this new name that is then associated with the asset in that context key. Any component that requires the same asset name with the same context key will attach to this new name.

Recording the Relationship with Context key

When an asset such as a variable, type, action chain or event handler is created in the context of a context key it may be desirable to be able to "remember" that fact, so that when another autowiring event comes along asking for the same asset in the same context key the framework will know what to re-use from the existing definitions. To do this it is possible to leverage a concept that is already present in the distributed application development platform, that of decorators in the metadata. The decorator layers on some addition platform specific metadata that maintains the link between the original source operation and an asset. As an example, consider what the fooContextType definition might look like once realized into the application app-flow.json, in this case there may be a naming collision with an existing type so a new name needed to be generated for the auto-wire type.

```
Sample app-flow.json

"types": {
        "fooContextType1":{
            "guid": "string",
            "savedSearch": "string"
        },
        "@decorators.fooContextType1" {
            "vbdt":{
                "autowire":{
                    "context key":"fooSharedContext key",
                    "name":"fooContextType"
                }
            }
        }
    }
}
```

Line 6—the @decorators.fooContextType1 entry describes the corresponding fooContextType1 type. Line 9—defines the context key that this asset is linked to. Line 10—defines the name that was originally requested for this associated asset. It is the combination of this requested name and the context key that the design time will use to match subsequent definitions to.

In various embodiments, the creation of action chains (also referred to as event handers) is considered as well as variables and types. To do this the framework can simply extend the definitions that have already been discussed to include action chains. The implementation within the components assetDefinition follows:

Sample fooSearchAssetDef.json

```
{
"":{
    "scope":{
        "page" : {
            "variables" : {
                "@@fooSearch@@": {
                    "type": "string",
                    "required": false,
                    "rateLimit": {
                        "timeout": 100
                    },
                    "input": "fromUrl",
                    "persisted":"none"
                }
            },
            "chains" : {
                "@@searchChangeAction@@": {
                    "root": "fireNotification1",
                    "description": "Tell the user the variable value has changed",
                    "actions": {
                        "fireNotification1": {
                            "module":"vb/action/builtin/fireNotificationEventAction",
                            "parameters": {
                                "displayMode": "persist",
                                "type": "info",
                                "message": "Bound value has changed!"
                            }
                        }
                    }
                }
```

Sample fooSearchAssetDef.json
-continued

```
                    }
                }
            }
        },
        "fooSharedContext key":{
            "scope": {
                "application":{
                    "variables" : {
                        "@@fooContext@@": {
                            "type": "application:@@fooContextType@@"
                        }
                    },
                    "types": {
                        "@@fooContextType@@":
                        {"$ref":"foo/fooshared/extension/vbcs/assets/sharedDefintions.json#types/fooContextType"}
                    }
                }
            }
        }
}
```

Line 16: Within the context of a particular scope action chains can be defined as required. As with variables, if more than one component tries to create the same chain in the same scope and context key then only one copy of the chain would be created. In this particular example the chain searchChangeAction is defined with an empty context key and so would always create a unique instance of the chain.

Lines 17-26: A chain is defined with the same definition as would be used within VBCS allowing for simple prototyping and then copy and paste across into the assetDef file. This definition could, of course also include chain specific variables. Standards may be need to be set about these chains to be correctly parameterized (e.g. not having hard-coded references to variables or component IDs that the author "expects" to be present).

Having defined chains it may be useful to wire those to events on the page, including events raised from the component itself and its individual properties. So initially listeners are defined in the assetDef, using the following format:

Sample fooSearchAssetDef.json

```
{
"":{
    "scope":{
        "page" : {
            "variables" : {
                "@@fooSearch@@": {
                    "type": "string",
                    "required": false,
                    "rateLimit": {
                        "timeout": 100
                    },
                    "input": "fromUrl",
                    "persisted":"none"
                }
            },
            "chains" : {
                "@@searchChangeAction@@": {
                    "root": "fireNotification1",
                    "description": "Pointlessly tell the user the variable value has changed",
                    "actions": {
                        "fireNotification1": {
                            "module":"vb/action/builtin/fireNotificationEventAction"
", "parameters": {
                                "displayMode": "persist",
                                "type": "info",
```

-continued

Sample fooSearchAssetDef.json

```
                    "message": "Bound value has changed!"
                }
            }
        },
        "@@someStartupChain@@": {
            "root": "fireNotification1",
            "description": "Pointlessly tell the user the page has started",
            "actions": {
                "fireNotification1": {
                    "module":"vb/action/builtin/fireNotificationEventAction",
                    "parameters": {
                        "displayMode": "persist",
                        "type": "info",
                        "message": "welcome to the page!"
                    }
                }
            }
        },
        "eventListeners":{
            "@@onSearchValueChange@@":{
                "chains": [
                    {
                        "chainId": "@@searchChangeAction@@",
                        "parameters": {
                            "value": "{{ $event.detail.value }}"
                        }
                    }
                ]
            },
            "vbEnter":{
                "chains": [
                    {
                        "chainId": "@@someStartupChain@@",
                        ...
                    }
                ]
            }
        }
    }
}
},"fooSharedContext key":{
    "scope": {
        "application":{
            "variables" : {
                "@@fooContext@@": {
                    "type": "application:@@fooContextType@@"
                }
            },
            "types": {
                "@@fooContextType@@":{"$ref":"foo/fooshared/extension/vbcs/assets/sharedDefintions.json#types/fooContextType"}
            }
        }
    }
}
```

Line 31: An eventListeners section is introduced to define the listeners required in a given scope and context key. Line 35: The chainId reference to searchChangeAction provides the link back to a chain that is defined within this file as well. As usual, the names involved may need to be fixed up on drop if there are collisions with existing chainIds. Line 54: In some embodiments, there is no reason why general listeners for component or application events such as the vbEnter listener indicated here cannot be created when the assetDef is processed. For example, in this case the listener name may be fixed and the defined chain added into the defined chains for that event if a listener was already defined.

Next associating one of these listeners with both the component as a whole and specifically a given property in the case of a property-change event. With reference back to the main part of the component.json for this as follows:

---
Sample component.json:
---

```
{
"name": "search",
"pack":"foo",
...
"properties": {
        "searchString":{
                "type":"string",
                "description":"Free text search expression",
                "writeback":"true",
                "extension":{
                        "vbdt":{
                                "variable":"{{Spage.variab;es.@@fooSearch@@}}",
                                "listener":"[[$listeners..@@onSearchValueChange@@]]"
                        }
                }
        }
},
"events":{
        "searchRefresh": {
                "bubbles": true,
                "cancelable": false,
                "detail": {
                        "payload": {
                                "type": "string"
                        }
                }
                "extension":{
                        "vbdt":{
                                "listener":"[[$listeners.@@onSearchRefresh@@]]"
                        }
                }
        }
},
"extension": {
        "vbcs": {
                "assetDefinition": { "$ref": "../extension/vbcs/fooSearchAssetDef.json"
        }
                }
        }
}
```

Line 13: To add a property change listener to the markup (e.g. in this case an on-searchstring-changed event) a new listener asset may be defined directly to the property extension. Line 30: For all other component events apart from the special property change events the listener may be added as an extension metadata to the event definition itself. As before, the name of the listener supplied may be fixed up if it clashes with some existing listener in the page.

In various embodiments, as an extension of the case of a component requiring action chains it is possible that one of those action chains will incorporate vb/action/builtin/call ModuleFunctionAction in which case it may be desirable to supply the implementation of the required functions. One approach is to allow this class of assets to actually be referenced from within the component distribution. To do this some embodiments extend the assetDef configuration to include a function modules asset identified by a given key as follows:

Sample fooSearchAssetDef.json

```
{
"":{
    "scope":{
        "page" : {
            "variables" : {
                ...
            },
            "chains" : {
                "@@searchChangeAction@@": {
                    "root": "callModuleFunction1",
                    "variables": {
                        "user": {
                            "type": "string"
                        }
                    },
                    "actions": {
                        "callModuleFunction1": {
                            "module":"vb/action/builtin/callModuleFunctionAction",
                            "parameters": {
                                "module": "foo-search:functions",
                                "functionName": "doStuff",
                                "params": [
                                    "{{ $chain.variables.user }}"
                                ]
                            }
                        }
                    }
                }
            }
        },
        "application":{
            ...
        }
    },
    "functionModules":{
        "foo-search":{
            "$ref":"foo/foo search/extension/vbcs/functions/pageFunctions"
        },
        "foo-shared":{
            "$ref":"foo/foo -shared/extension/vbcs/functions/commonAppFunctions"
        }
    }
}
}
```

Line 18: When an action chain makes a reference to the file containing the function via the module asset, this now makes a reference to a definition made in the functionModules section (Line 32). These references are read in the framework and the user will not be able to navigate to the implementing code as that will be referenced from within the component package. Line 18: Lines 33 and 36: Two custom scopes (peers of page, flow etc.) are defined which can be referenced by any action chains. Lines 34 and 37: the same $ref notation may be used to refer to the endpoint of the scope.

In various embodiments, if a component needs to access data from an external source such as a remote server it will be relying on at least one service definition to be present and bound to the application that the component is being used in. Functionally the service definition itself may comprise two sets of information, the service.json file itself and an associated transforms.js. and then an entry has to be made in the app-flow.json to record the service definition against a specified Service ID. To indicate the requirement for a service, a service element may be added into the correct scope in the existing assetDef file as follows:

Sample fooSearchAssetDef.json

```
{
"":{
    "scope":{
        "page" : {
            ...
        },
        "application":{
            ...
        }
    },
    "functionModules":{
        ...
    }
},
"fooSharedContext key": {
    "scope:{
        "application":{
            "services": {
                "@@knowledge@@":{
                    "service":{"$ref":"extension/vbcs/services/knowledge/service.json"},
                    "transforms":{"$ref","extension/vbcs/services/knowledge/transforms.js"}
                }
            }
        }
    }
}
}
```

Line 18: a new services node is introduced to hold the definitions of services, in this case within the fooSharedContext key application scope (services may also be defined in flow scope). Line 19: The name used here for the service will be used both for the Service ID and the destination location that the specified service and transforms files will be copied into. As usual we will have to watch out for naming collision but can follow the same rules with respect to the context key determining if an asset can be re-used or if a new one has to be created. (see note below). Lines 20-21: The referenced files for the service definition and any transforms will be copied wholesale into the application. Therefore, existing service definitions can be used. These same service definition files may referenced from a shared resource component if required.

In a specific case of integrating a component with a service endpoint defined by auto-wiring techniques may be used to keep the overall API as clean as possible in use. In this case the point of interest is the service name that the autoWiring may define. Given that the component author has supplied the full definition for the service and then consumes the service it would be ideal if the component internally defaulted the name of the endpoint and did not have to have it explicitly set unless the generated name for the service was forced to deviate from the requested name by a collision. Follows is such a property definition:

Sample component.json:

```
{
"name": "search",
"pack":"foo",
...
"properties": {
    "chatService":{
        "type":"string",
        "description":"Name of the service endpoint used for chat (default chatServer)",
        "writeback":"false",
        "value":"chatServer"
        "extension":{
            "vbdt":{
                "value":"@@chatServer@@"
            }
        }
    }
},
"extension": {
    "vbdt" : {
        "assetDefinition":{
            "fooContext key": {
                "scope:{
                    "application":{
                        "services": {
                            "@@chatServer@@":{
"service":{"$ref":"extension/vbcs/services/chat/service.json"}
                            }
                        }
                    }
                }
            }
        }
    }
}
}
```

In this case, a technique in provided to create a service definition called "chatServer" and the component chatService property is set up to use that value by default (Line 10—the value asset). In the chatService.extension.vbdt.value the seeded value of this chatService property is defined to be the final resolved name of the created chatServer service. If it turns out that the chatServer name is available and the service is created with that name then as the chatService.extension.vbdt.value==chatService.value there is no need to explicitly set value on the created tag in the page. e.g., <foo-chat></foo-chat>. However, if there was a naming collision, then a case is presented where the name of the create service does not equal the selected default. In this case the Design Time does have to write the asset to "override" the default value: <foo-chat chat-service="chatServer2"></foo-chat>.

In various embodiments, a component may implement a UI Pattern where it needs to create UI as well as the other asset types defined here. Although a UI Pattern could define variables, action chains etc. for itself, any components that it directly consumes will also be processed for their auto-wiring requirements. Thus, in many cases the only auto-wiring specification made explicitly for a UI Pattern component would be that of defining a template html fragment for inclusion at the drop target. However, that aside auto-wiring requirements should be processed with the UI Pattern being processed first, followed by the defined dependencies of the pattern in the order that they are listed. As an illustration follows is an example of a UI Pattern component that composes two components, one a custom component and the second an <oj-table> (A predefined component provided by the Oracle JET toolkit):

Sample UI Pattern component.json

```
{
    "name":"search-template",
    "pack":"foo",
    "type":"vbcs-pattern",
    "version":"1.0.0",
    "dependencies":{"foo-search":"1.0.0"},
    "extension": {
        "vbdt": {
            "template": {
                "content": {
                    "$ref":"extension/
                        resources/vbcs/template.html"
                }
            },
            "assetDefinition": {
                "$ref": "extension/
                    resources/vbcs/asset-definition.json"
            }
        }
    }
}
```

The assetDefintion defines all of the variables and types that are needed, in this case a Service Data Provider with a Custom Fetch Train.

Sample asset-defintion.json

```
{
    "":{
        "scope":{
            "page":{
```

-continued

Sample asset-defintion.json

```
"variables": {
    "@@vbAccName@@": {
        "type": "string",
        "input": "none"
    },
    "@@searchListServiceDataProvider@@": {
        "type": "vb/ServiceDataProvider",
        "defaultValue": {
            "endpoint":
            "@@searchAccountRest@@/postSearch",
                "idAttribute": "personId",
                "itemsPath": "response",
                "responseType":
                "page:@@postSearch@@",
                "fetchChainId":
            "@@customSearchFetchAction@@"
        }
    },
    "@@displaySearchResults@@": {
        "type": "boolean",
        "defaultValue": false
    }
},
"types": {
    "@@postSearch@@": {
        "response": [
            {
                "accountInfo": "string",
                "name": "string",
                "address": "string",
                "accountId": "string",
                "personId": "string"
            }
        ]
    },
    "@decorators.postSearch": {
        "endpoint": "postSearch",
        "service": "@@vbSearchAccountRest@@",
        "path": "response"
    }
},
"chains":{
    "@@searchClickAction@@": {
        "description": "",
        "variables": {
            "detail": {
                "required": true,
                "type": "any",
                "input": "fromCaller"
            }
        },
        "root": "if1",
        "actions": {
            "if1": {
                "module":
            "vb/action/builtin/ifAction",
                "label": "CheckForSearchTerm",
                "parameters": {
                    "condition": "{{
            $page.variables.@@vbAccName@@ }}"
                },
                "outcomes": {
                    "true": "if2",
                    "false": "assignVariables2"
                }
            },
            "assignVariables2": {
                "module":
            "vb/action/builtin/assignVariablesAction",
                "label": "Set Result Display off",
                "parameters": {
                    "$page.variables.@@displaySearchResults
            @@": {
                        "source": "{{ false }}"
                    }
                }
            },
```

Sample asset-defintion.json

```
                    "fireDataProviderEvent1": {
                        "module":
                "vb/action/builtin/fireDataProviderEventAction",
                        "label": "Invoke Search",
                        "parameters": {
                        "target": "{{
                $page.variables.@@searchListServiceDataProvider
                @@ }}",
                            "refresh": null
                        }
                    },
                    "assignVariables1": {
                        "module": "vb/action/builtin/assignVariablesAction",
                        "label": "Ensure Results Displayed",
                        "parameters": {
                            "$page.variables.@@displaySearchResults@@": {
                                "source": "{{ true }}"
                            }
                        }
                    },
                    "if2": {
                        "module": "vb/action/builtin/ifAction",
                        "label": "Are Results Already Visible\n",
                        "parameters": {
                            "condition":
                "{{$page.variables.@@displaySearchResults@@}}"
                        },
                        "outcomes": {
                            "false": "assignVariables1",
                            "true": "fireDataProviderEvent1"
                        }
                    }
                },
                "returnType": "object"
            },
            "@@customSearchFetchAction@@": {
                "root": "callRestEndpoint1",
                "actions": {
                    "callRestEndpoint1": {
                        "module": "vb/action/builtin/restAction",
                        "parameters": {
                            "requestType": "json",
                            "endpoint":
"@@vbSearchAccountRestvbSearchAccountRest@@/postSearch",
                            "responseType": "page:@@postSearch@@",
                            "body": "{{ $chain.variables.requestBody}}"
                        },
                        "outcomes": {
                            "success": "return1"
                        }
                    },
                    "return1": {
                        "module": "vb/action/builtin/returnAction",
                        "parameters": {
                            "outcome": "success",
                            "payload": "{{ $chain.results.callRestEndpoint1 }}"
                        }
                    }
                },
                "variables": {
                    "requestBody": {
                        "type": {
                            "request": {
                                "name": "string"
                            }
                        },
                        "defaultValue": {
                            "request": {
                                "name": "{{ $page.variables.@@vbAccName@@
                }}"
                            }
                        }
                    }
                }
            }
        }
    },
    "eventListeners": {
```

| Sample asset-defintion.json |
|---|

```
        "@@searchClick@@": {
        "chains": [
                {
                        "chainId": "@@searchClickAction@@",
                        "parameters": {
                                "detail": "{{ $event.detail }}"
                        }
                }
        ]
}
},
"imports": {
        "components": {
                "oj-label": {
                        "path": "ojs/ojlabel"
                },
                "oj-demo-search": {
                        "path": "oj-demo-search/loader"
                },
                "oj-buttonset-one": {
                        "path": "ojs/ojbutton"
                },
                "oj-table": {
                        "path": "ojs/ojtable"
                }
        }
}
},
"services": {
"@@vbSearchAccountRest@@":{
        "service":{"$ref":"extension/vbcs/services/service.json"}
        }
}
}
}
```

The following template contains the DOM fragment that may be created in the page with the relevant references to the assets defined in the auto-wiring.

```
template.html
<div class="oj-flex">
        <div class="oj-flex-item oj-sm-12 oj-md-4"></div>
        <div class="oj-panel oj-flex-items-pad oj-flex-item oj-sm-12 oj-md-4"
id="div-1073407736-1">
                <div class="oj-flex">
                        <div class="oj-flex-item oj-sm-12 oj-md-2"></div>
                        <oj-label for="@@demo-search@@" class="oj-flex-item oj-sm-12 oj-md-
2">Name:</oj-label>
                        <oj-demo-search id="@@demo-search@@" class="oj-flex-item oj-sm-12
                ojmd-
8"
                                value="{{ $page.variables.@@vbAccName@@ }}"></oj-demo-
                        search>
                </div>
                        <div class="oj-flex">
                                <div class="oj-flex-item oj-sm-12 oj-md-4"></div>
                                <oj-buttonset-one class="oj-flex-item oj-sm-12 oj-md-5"
                        chroming="full"
                        on-click="[[$listeners.@@searchClick@@]]">
                                        <oj-option value="Get Account">Get Account</oj-option>
                                </oj-buttonset-one>
                        </div>
        </div>
</div>
<div class="oj-flex">
        <div class="oj-flex-item oj-sm-12 oj-md-12">
                <oj-bind-if test="{{ $page.variables.@@displaySearchResults@@}}">
                        <oj-table summary="Sample Table" scroll-policy="loadMoreOnScroll"
                                class="oj-flex-item oj-sm-12 oj-md-12"
                                data="[[$page.variables.@@searchListServiceDataProvider@@]]"
columns="[{"headerText":"name","field":"name
"},{"headerText":"address","field":"
```

-continued

```
;address"},{"headerText":"personId","field"
;:"personId"},{"headerText":"accountId","field
":"accountId"}]">
                </oj-table>
            </oj-bind-if>
      </div>
</div>
```

The service.json may also be included in the component distribution, note that this is the exported version of the service swagger file and the info.x-vb.credentials are is not encoded as this will need to be supplied by the host VBCS instance. In the case where the authentication for a service is BASIC then further authentication setup may be needed as a manual operation—for example the user may be prompted to go and do this when the autowiring takes place. Of course in most scenarios it would expect that the framework would be used and no additional configuration would be required.

asset-defintion.json

```
{
    "swagger": "2.0",
    "info": {
        "title": "vbSearchAccountRest",
        "x-vb": {
            "dt-serviceAuthentication": {
                "type": "basic",
            },
            "dt-wizardType": "rest"
        },
        "version": "1.0.0"
    },
    "schemes": [
        "https"
    ],
    "host": "ics-a407573.integration.us2.oraclecloud.com",
    "basePath": "/integration/flowapi/rest/VBCS_ACCSEARCH/v01/metadata/accounts",
    "definitions": {
        "Postsearch": {
            "type": "object",
            "properties": {
                "request": {
                    "$ref": "#/definitions/Request"
                }
            }
        },
        "Request": {
            "type": "object",
            "properties": {
                "account": {
                    "type": "string"
                },
                "name": {
                    "type": "string"
                },
                "address": {
                    "type": "string"
                },
                "city": {
                    "type": "string"
                },
                "postal": {
                    "type": "string"
                }
            }
        },
        "PostsearchResponse"
            "type": "object",
            "properties": {
                "response": {
                    "$ref": "#/definitions/Response"
                }
            }
        },
        "Response": {
            "type": "object",
            "properties": {
                "accountInfo": {
```

-continued

| asset-defintion.json |
|---|

```
                    "type": "string"
                },
                "name": {
                    "type": "string"
                },
                "address": {
                    "type": "string"
                },
                "accountId": {
                    "type": "string"
                },
                "personId": {
                    "type": "string"
                }
            }
        }
    },
    "paths": {
        "/search": {
            "post": {
                "operationId": "postSearch",
                "consumes": [
                    "application/json"
                ],
                "parameters": [
                    {
                        "x-vb": {
                            "examples": {
                                "application/json": "{\n \"request\" : {\n \"account\" : \"\",\n \"name\" : \"abc\",\n \"address\" : \"\",\n \"city\" : \"\",\n \"postal\" : \"\"\n }\n}"
                            },
                            "inferred": true
                        },
                        "schema": {
                            "$ref": "#/definitions/Postsearch"
                        },
                        "name": "body",
                        "in": "body"
                    }
                ],
                "produces": [
                    "application/json"
                ],
                "responses": {
                    "default": {
                        "examples": {
                            "application/json": "{\n \"response\": [\n {\n \"accountInfo\": \"No Account Information\",\n \"name\": \"ABC Agency\",\n \"address\": \"\",\n \"accountId\": \"\",\n \"personId\": \"4822407482\"\n },\n {\n \"accountInfo\": \"(Main customer - Acct. 0757774590)\",\n \"name\": \"ABC Plastics\",\n \"address\": \"198 Utah Street, San Francisco, CA, 94103, USA, Factory - large, 0915604366\",\n \"accountId\": \"0757774590\",\n \"personId\": \"6279488509\"\n },\n {\n \"accountInfo\": \"(Main customer - Acct. 2800282714) No Service Agreement.\",\n \"name\": \"ABC Premise Management Landlord\",\n \"address\": \"\",\n \"accountId\": \"2800282714\",\n \"personId\": \"1675885196\"\n },\n {\n \"accountInfo\": \"(Main customer - Acct. 3463751875)\",\n \"name\": \"ABC Tool & Die\",\n \"address\": \"1090 26th Street, San Francisco, CA, 94107, USA, Factory - large, 9193886135\",\n \"accountId\": \"3463751875\",\n \"personId\": \"0674394609\"\n }]\n}"
                        },
                        "schema": {
                            "$ref": "#/definitions/Postsearch"
                        },
                        "description": "The content returned by the server."
                    },
                    "x-vb": {
                        "inferred": {
                            "default": true
                        }
                    }
                },
                "x-vb": {
```

| asset-defintion.json |
|---|
| ```
            "headers": {
                "X-HTTP-Method-Override": "PATCH"
            }
        },
        "x-vb-actionHint": "retrieveMany"
    }
}
}
}
``` |

Application Development Processes with Self-Wiring or Self-Configuration of Components

Figure 3:
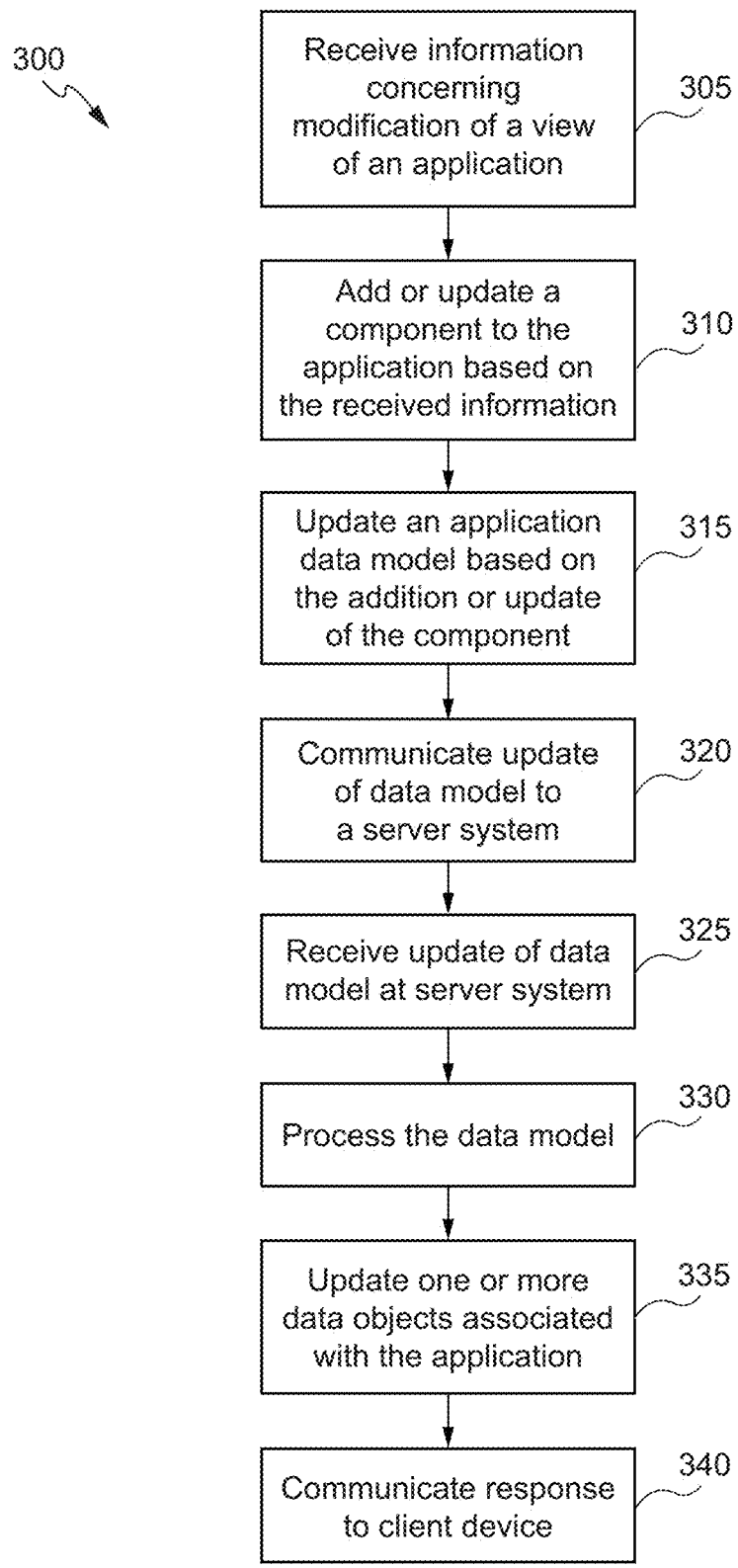
FIG. 3 depicts a flowchart illustrating a process for facilitating a user to build an application in accordance with various embodiments.
Figure 4:
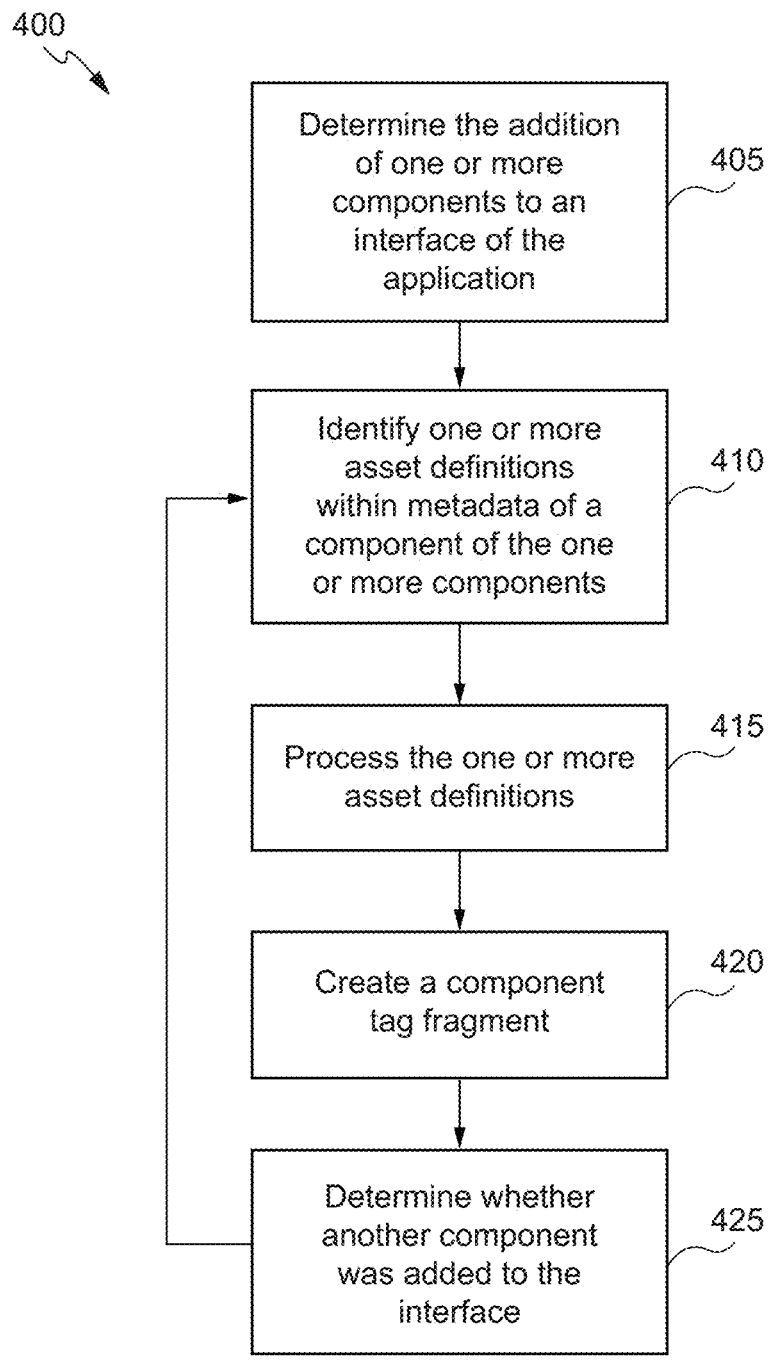
FIG. 4 depicts a flowchart illustrating a process for facilitating self-wiring or self-configuring of a component in an application in accordance with various embodiments.

FIGS. 3 and 4 illustrate processes and operations for application development. Individual embodiments may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes and/or operations depicted in FIGS. 3 and 4 may be implemented in software (e.g., code, instructions, program) executed by one or more processing units (e.g., processors cores), hardware, or combinations thereof. The software may be stored in a memory (e.g., on a memory device, on a non-transitory computer-readable storage medium). The particular series of processing steps in FIGS. 3 and 4 is not intended to be limiting. Other sequences of steps may also be performed according to alternative embodiments. For example, in alternative embodiments the steps outlined above may be performed in a different order. Moreover, the individual steps illustrated in FIGS. 3 and 4 may include multiple sub-steps that may be performed in various sequences as appropriate to the individual step. Furthermore, additional steps may be added or removed depending on the particular applications. One of ordinary skill in the art would recognize many variations, modifications, and alternatives.

FIG. 3 shows a flowchart 300 that illustrates a process for building an application using a component capable of self-wiring or self-configuring. In various embodiments, the processes depicted in flowchart 300 may be implemented by the architecture, systems, and techniques depicted in FIGS. 1 and 2A-2D. In various embodiments, a process is provided for building an application that enables a user to create an application by simply designing a user interface for the application using one or more components (e.g., a user interface component). Responsive to changes made by the user in the application's user interface, components for the user interface are added or updated in the application and configured with assets such as variables, event handlers, translations, etc. In some embodiments, the components used to build the application are reusable or generic and can be used across multiple types of applications. In some embodiments, at least one of the components comprises metadata with configuration coding as discussed in detailed herein for self-wiring or self-configuring of the component within the application. For example, self-wiring or self-configuring instructions may be written within the metadata that allows a user to package an asset definition with their components or UI patterns, which provides information about what services, variables, types, action chains, and listeners need to be created and in which scope when the component is dropped onto the page. The self-wiring or self-configuring instructions may also provide additional hints with the component metadata to bind individual properties and event listeners to these assets once created. The self-wiring or self-configuring instructions may also provide a way for assets to be shared between multiple components allowing for automatic component to component binding via VBCS variables and re-use of common assets such as variable type definitions, which may be common across multiple components within a set.

Once the component is added or updated to the application's user interface, the data objects associated with the component are automatically created for the application. For example, if the data objects are implemented using a remote service, the application may be updated with all of the metadata required to access and map the data from that service. The data objects are also automatically bound to the components in the application's user interface. As changes are made to the application's user interface by the user (for example, by adding or removing one or more components from the application's user interface, changing one or more assets of the components in the application's user interface, etc.), a view model for the application, which identifies a view structure for the application, is automatically updated. Changes to a data model for the application, which identifies the structure of data for the application, are automatically determined based upon the changed view model. The changed data model is then used to automatically determine and dynamically make updates to the business objects for the application and their associated bindings. The author of an application thus can build an application by primarily working with the components rather than with any data objects. More advantageously, the components may be self-wiring or self-configuring, and thus the author does not have to know how to wire the components to operate within the application's user interface.

As described herein with respect to FIG. 1, a user builds an application by building the user interface for the application using one or more components provided by the application builder tool. Accordingly, processing may be initiated at step 305, when a view of an application is modified. In some embodiments, information indicative of the view modification is received by the data processing system, for example, the application builder tool executing on the client device. In certain embodiments, the application builder GUI module of the application builder tool is configured to receive information indicating whether a user has made a change to the view of the application. Various different actions performed by the user may cause a change or modification to the view of the application. For example, the view of the application may be changed when the user adds a new component to the user interface for the application. For example, in FIG. 2A, when the user selects and drags and drops a chart component onto a canvas area or page, this changes the view of the application. Changing an asset of a UI component that is already part of the user interface for the application may also change the view of the application. For example, assigning labels "Date" and "description" to the columns of table UI component may also change the view of the application. As another example, changing the number of columns of table component may also change the view of the application. As described above, an application can comprise multiples pages. Changing the pages or the relationship between the pages may also cause a change to the view of the application. Additionally, as previously described, a page can comprise one or more components, where one component can have a specific relationship with another component on the page. Changing the relationships between components on a page may also cause the view of the application to change.

At step 310, a component is added or updated to the application's user interface based on the information received at step 305. In various embodiments, the adding or updating of the component is achieved automatically by the component. For example, the components may comprise metadata with configuration coding as discussed in detailed herein for self-wiring or self-configuring of the component within the application's user interface. In some embodiments, the self-wiring or self-configuring instructions from the component define specific variable(s) to be created when the component is added into a page or application. In some embodiments, the self-wiring or self-configuring instructions from the component define action chains to be created when the component is added into a page or application, optionally these may be bound to listeners on the component. In some embodiments, the self-wiring or self-configuring instructions from the component define action chains, which depend on module functions being available. In some embodiments, the self-wiring or self-configuring instructions from the component ensure that a given service exists and is available to the application for the component. In some embodiments, the self-wiring or self-configuring instructions from the component define a specific variable of type Service Data Provider to be created when the component is added into a page or application, and the associated service definition needs to be created along with (optional) transformations. In some embodiments, the self-wiring or self-configuring instructions implement a UI Pattern where the component needs to create UI as well as define other asset types.

At step 315, an application data model may be updated based on the adding or updating of the component at step 310. In some embodiments, the addition or modification of a component processed at step 310 can cause a data model associated with the application to change. At step 320, the updated data model may be communicated from the client device to a server system, such as from the client device to the server system. Various different techniques may be used for communicating the information. In certain embodiments, the application metadata may be communicated to the server system in a serialized format such as using one or more files. At step 325, the updated data model is received at the server system. In certain embodiments upon receiving the information at step 325, a server-side synchronizer module may be configured to store the received updated data model information in an application store for the particular application. At step 330, the application data model received at step 325 is processed by the server system. The processing may include comparing the received data model with the application data model stored in application store on the server system, and determining a change of the data model based on the comparison. At step 335, one or more data objects associated with the application may be updated as a result of a change to the data model for the application as detected at step 330. At step 340, a response may be communicated to the client device by the server system. The response communicated can indicate that the server system has processed the data model.

FIG. 4 shows a flowchart 400 that illustrates a process for self-wiring or self-configuring of a component. In some embodiments, the processes depicted in flowchart 400 may be implemented by the architecture, systems, and techniques depicted in FIGS. 1 and 2A-2D. As described herein with respect to FIG. 1, a user builds an application by building the user interface for the application using one or more components provided by the application builder tool. Accordingly, processing may be initiated at step 405, when one or more components are added to an application's user interface by a data processing system, for example, the application builder tool executing on the client device. In alternative embodiments, the processing may be initiated when one or more components are updated within the application's user interface or when one or more components are added and updated within the application's user interface. In some embodiments, the data processing systems determines the addition of one or more components to an interface of the application.

At step 410, one or more asset definitions are identified within metadata of a component (e.g., a first component) of the one or more components by the data processing system. In some embodiments, the one or more asset definitions provide self-wiring or self-configuring instructions about the assets that need to be created for the component within a predefined scope when the component is added or updated to the application's user interface In some embodiments, the assets include variables, types, action chains, and listeners. In some embodiments, the predefined scope defines the functional and content requirements of the component. In some embodiments, the self-wiring or self-configuring instructions from the component define specific variable(s) to be created when the component is added into a page or application. In some embodiments, the self-wiring or self-configuring instructions from the component define action chains to be created when the component is added into a page or application, optionally these may be bound to listeners on the component. In some embodiments, the self-wiring or self-configuring instructions from the component define action chains, which depend on module functions being available. In some embodiments, the self-wiring or self-configuring instructions from the component ensure that a given service exists and is available to the application for the component. In some embodiments, the self-wiring or self-configuring instructions from the component define a specific variable of type Service Data Provider to be created when the component is added into a page or application, and the associated service definition needs to be created along with (optional) transformations. In some embodiments, the self-wiring or self-configuring instructions implement a UI Pattern where the component needs to create UI as well as define other asset types.

In some embodiments, the asset definition is identified by an asset expression in a create tag of the asset definition. The asset expression defines a asset reference that will be substituted in the asset for the component. For example, a variable reference may be a URL for a data set that will be substituted into the x-axis (asset) of a bar chart (component). In some embodiments, containers can be defined within the metadata for each available scope for asset creation. This allows the metadata to include asset definitions in each of the scopes as required functionally by the component. In certain embodiments, the one or more asset definitions are identified within a page scope.

At step 415, the one or more asset definitions are processed by the data processing system. In some embodiments, for each asset definition (e.g., an asset definition for a variable) the data processing system determines whether the asset is defined with a context key. A context key is name or alpha/numerical code associated with an asset (e.g., a service, variable, type definition, or action chain) and is used to solve the problem of component-to-component auto-wiring. If the asset is defined with no context key (e.g., is nested in the " ":{ } section of the asset definition) then the data processing system: (i) determines if a requested name of the asset (the name used in the metadata for the service, variable, typedef or action chain) is used in the requested scope, when the requested name is not already used then the requested name for the asset will be set to the assigned name (e.g., fooSearch), and when the requested name is already used then a new name will be generated to avoid a collision (e.g., fooSearch_1), which will be used as the assigned name, and (ii) creates the asset(s) for the component in the required scope with the assigned name based on the asset definition. If the asset is defined with a context key then the data processing system determines whether there is a matching context key for the application's user interface. If there is no matching context key, then the data processing system: (i) determines if a requested name of the asset (the name used in the metadata for the service, variable, typedef or action chain) is used in the requested scope, when the requested name is not already used then the requested name for the asset will be set to the assigned name (e.g., fooSearch), and when the requested name is already used then a new name will be generated to avoid a collision (e.g., fooSearch_1), which will be used as the assigned name, and (ii) creates the asset for the component in the required scope with the assigned name based on the asset definition. If there is a matching context key, then the data processing system will associate the asset with an existing asset definition linked with the context key rather than creating a new asset for the component with the assigned name based on the asset definition.

For example, if two components are dropped onto a page that both require a string variable with the name, for example "baa" then, because there is no shared context, the first component would create and bind to a string variable called baa and the second component to be dropped would sense the collision with the existing baa variable and so create its variable as baa_1 to avoid disrupting the existing definitions. If, on the other hand, both components provide a definition of a string variable baa with matching context keys then a shared contract is being defined. In this case, the first component to be dropped would again create the string variable baa in the desired scope, and add a context key marker. However, this time, when the second component is dropped because of the match of variable name, type and context key the second component will not create a new variable baa_1 but instead will associate the asset with the existing baa variable definition. In various embodiments, the first component specifying a given context key with an asset will be the one that determines the name used. By default this would be the same as the name of the asset, however, as mentioned above, collision with an existing asset (that is not associated with the context key) would require that a unique name be generated and it would be this new name that is then associated with the asset in that context key. Any component that requires the same asset name with the same context key will attach to this new name.

At step 420, a component tag fragment is created by the data processing system. In some embodiments, each HTML element asset defined for that component may be associated with an asset such as a variable or listener defined by the processing discussed in 415. The names assigned for these asset references in the tag fragment will map to the resolved names derived in the previous step. At step 425, a determination is made as to whether another component (e.g., a second component) was added to or updated within the application's user interface. When another component is added to or updated within the application's user interface, the data processing system, the process returns to step 410 to process the another component.

Illustrative Systems

Figure 5:
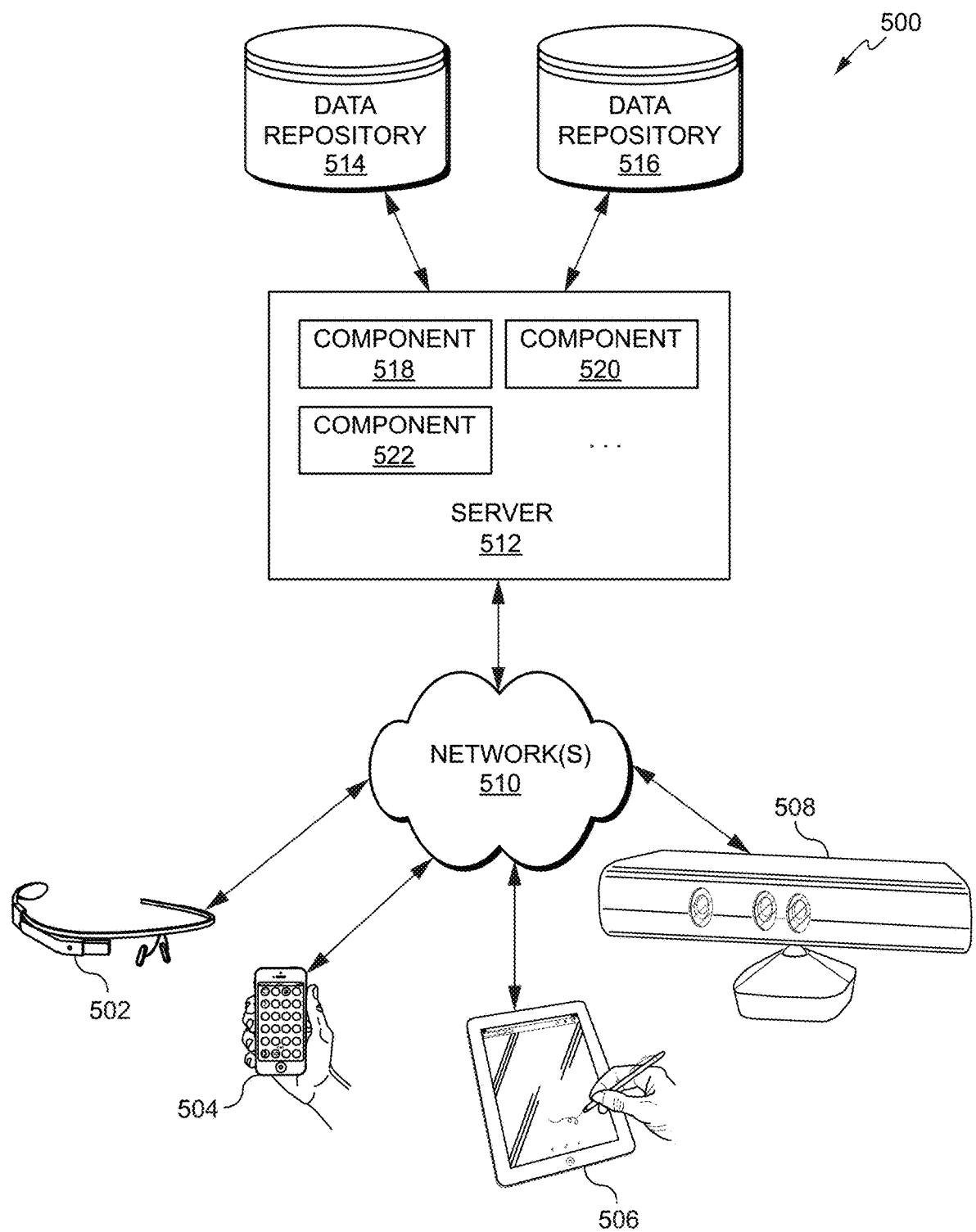
FIG. 5 depicts a simplified diagram of a distributed system for implementing various embodiments.

FIG. 5 depicts a simplified diagram of a distributed system 500 for implementing an embodiment. In the illustrated embodiment, distributed system 500 includes one or more client computing devices 502, 504, 506, and 508, coupled to a server 512 via one or more communication networks 510. Clients computing devices 502, 504, 506, and 508 may be configured to execute one or more applications.

In various embodiments, server 512 may be adapted to run one or more services or software applications that enable component based application development.

In certain embodiments, server 512 may also provide other services or software applications that can include non-virtual and virtual environments. In some embodiments, these services may be offered as web-based or cloud services, such as under a Software as a Service (SaaS) model to the users of client computing devices 502, 504, 506, and/or 508. Users operating client computing devices 502, 504, 506, and/or 508 may in turn utilize one or more client applications to interact with server 512 to utilize the services provided by these components.

In the configuration depicted in FIG. 5, server 512 may include one or more components 518, 520 and 522 that implement the functions performed by server 512. These components may include software components that may be executed by one or more processors, hardware components, or combinations thereof. It should be appreciated that various different system configurations are possible, which may be different from distributed system 500. The embodiment shown in FIG. 5 is thus one example of a distributed system for implementing an embodiment system and is not intended to be limiting.

Users may use client computing devices 502, 504, 506, and/or 508 to perform component based application development in accordance with the teachings of this disclosure. A client device may provide an interface that enables a user of the client device to interact with the client device. The client device may also output information to the user via this interface. Although FIG. 5 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 510 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 510 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 512 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 512 can include one or more virtual machines running virtual operating systems, or other computing architectures involving virtualization such as one or more flexible pools of logical storage devices that can be virtualized to maintain virtual storage devices for the server. In various embodiments, server 512 may be adapted to run one or more services or software applications that provide the functionality described in the foregoing disclosure.

The computing systems in server 512 may run one or more operating systems including any of those discussed above, as well as any commercially available server operating system. Server 512 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 512 may include one or more applications to analyze and consolidate data feeds and/or event updates received from users of client computing devices 502, 504, 506, and 508. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 512 may also include one or more applications to display the data feeds and/or real-time events via one or more display devices of client computing devices 502, 504, 506, and 508.

Distributed system 500 may also include one or more data repositories 514, 516. These data repositories may be used to store data and other information in certain embodiments. For example, one or more of the data repositories 514, 516 may be used to store information for component based application development. Data repositories 514, 516 may reside in a variety of locations. For example, a data repository used by server 512 may be local to server 512 or may be remote from server 512 and in communication with server 512 via a network-based or dedicated connection. Data repositories 514, 516 may be of different types. In certain embodiments, a data repository used by server 512 may be a database, for example, a relational database, such as databases provided by Oracle Corporation® and other vendors. One or more of these databases may be adapted to enable storage, update, and retrieval of data to and from the database in response to SQL-formatted commands.

In certain embodiments, one or more of data repositories 514, 516 may also be used by applications to store application data. The data repositories used by applications may be of different types such as, for example, a key-value store repository, an object store repository, or a general storage repository supported by a file system.

Figure 6:
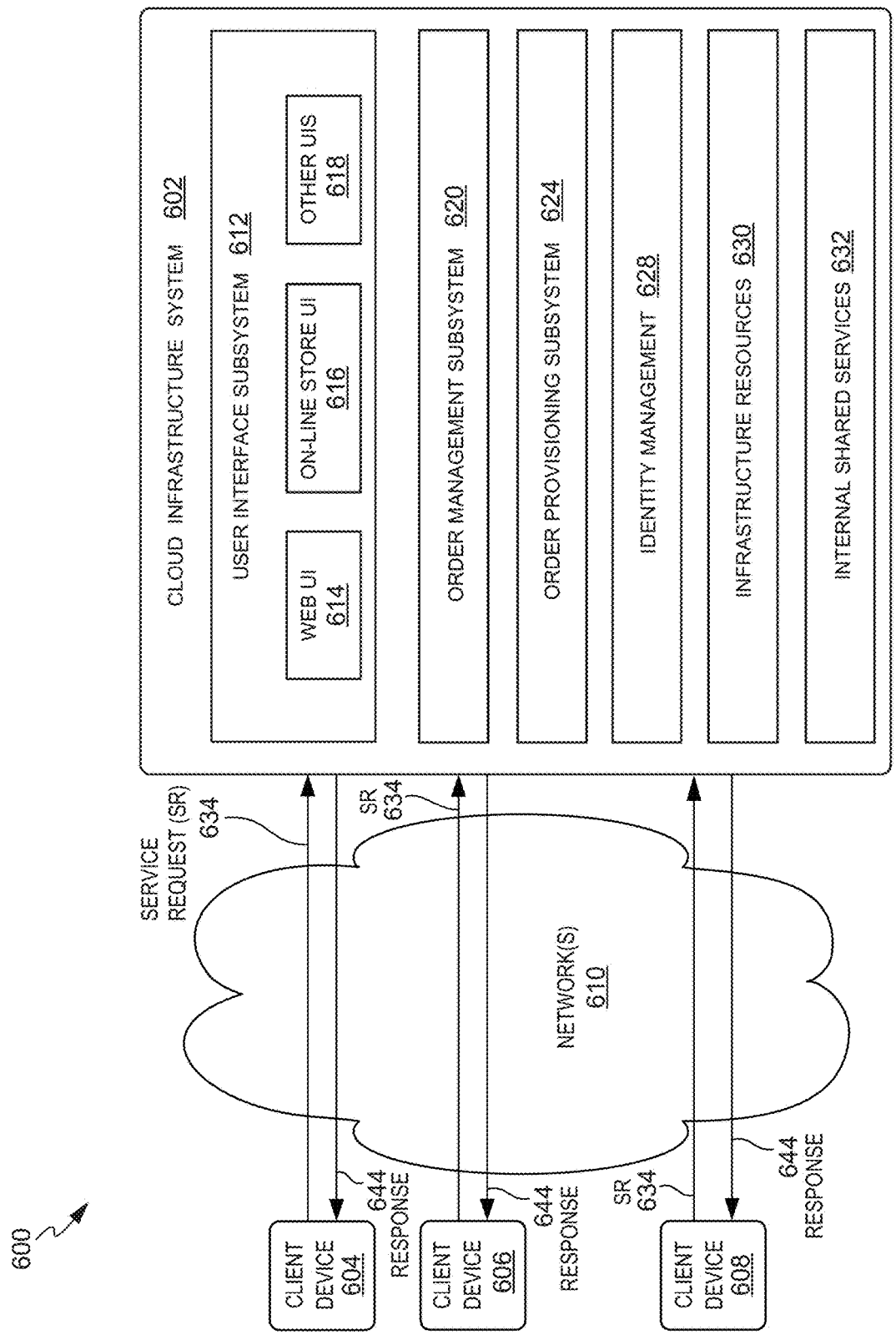
FIG. 6 is a simplified block diagram of one or more components of a system environment by which services provided by one or more components of an embodiment system may be offered as cloud services, in accordance with various embodiments.

In certain embodiments, the component based application development described in this disclosure may be offered as services via a cloud environment. FIG. 6 is a simplified block diagram of a cloud-based system environment in which the component based application development may be offered as cloud services, in accordance with certain embodiments. In the embodiment depicted in FIG. 6, cloud infrastructure system 602 may provide one or more cloud services that may be requested by users using one or more client computing devices 604, 606, and 608. Cloud infrastructure system 602 may comprise one or more computers and/or servers that may include those described above for server 512. The computers in cloud infrastructure system 602 may be organized as general purpose computers, specialized server computers, server farms, server clusters, or any other appropriate arrangement and/or combination.

Network(s) 610 may facilitate communication and exchange of data between clients 604, 606, and 608 and cloud infrastructure system 602. Network(s) 610 may include one or more networks. The networks may be of the same or different types. Network(s) 610 may support one or more communication protocols, including wired and/or wireless protocols, for facilitating the communications.

The embodiment depicted in FIG. 6 is only one example of a cloud infrastructure system and is not intended to be limiting. It should be appreciated that, in some other embodiments, cloud infrastructure system 602 may have more or fewer components than those depicted in FIG. 6, may combine two or more components, or may have a different configuration or arrangement of components. For example, although FIG. 6 depicts three client computing devices, any number of client computing devices may be supported in alternative embodiments.

The term cloud service is generally used to refer to a service that is made available to users on demand and via a communication network such as the Internet by systems (e.g., cloud infrastructure system 602) of a service provider. Typically, in a public cloud environment, servers and systems that make up the cloud service provider's system are different from the customer's own on-premise servers and systems. The cloud service provider's systems are managed by the cloud service provider. Customers can thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, Calif., such as middleware services, database services, Java cloud services, and others.

In certain embodiments, cloud infrastructure system 602 may provide one or more cloud services using different models such as under a Software as a Service (SaaS) model, a Platform as a Service (PaaS) model, an Infrastructure as a Service (IaaS) model, and others, including hybrid service models. Cloud infrastructure system 602 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 602. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 602. Cloud infrastructure system 602 then performs processing to provide the services requested in the customer's subscription order. For example, performing component based application development. Cloud infrastructure system 602 may be configured to provide one or even multiple cloud services.

Cloud infrastructure system 602 may provide the cloud services via different deployment models. In a public cloud model, cloud infrastructure system 602 may be owned by a third party cloud services provider and the cloud services are offered to any general public customer, where the customer can be an individual or an enterprise. In certain other embodiments, under a private cloud model, cloud infrastructure system 602 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other embodiments, under a community cloud model, the cloud infrastructure system 602 and the services provided may be shared by several organizations in a related community. Various other models such as hybrids of the above mentioned models may also be used.

Client computing devices 604, 606, and 608 may be of different types (such as devices 502, 504, 506, and 508 depicted in FIG. 5) and may be capable of operating one or more client applications. A user may use a client device to interact with cloud infrastructure system 602, such as to request a service provided by cloud infrastructure system 602. For example, a user may use a client device to perform component based application development described in this disclosure.

In some embodiments, the processing performed by cloud infrastructure system 602 for providing component based application development may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 602 for performing component configuration or component based application development. The data used for this analysis may include structured data (e.g., data stored in a database or structured according to a structured model) and/or unstructured data (e.g., data blobs (binary large objects)).

As depicted in the embodiment in FIG. 6, cloud infrastructure system 602 may include infrastructure resources 630 that are utilized for facilitating the provision of various cloud services offered by cloud infrastructure system 602. Infrastructure resources 630 may include, for example, processing resources, storage or memory resources, networking resources, and the like.

In certain embodiments, to facilitate efficient provisioning of these resources for supporting the various cloud services provided by cloud infrastructure system 602 for different customers, the resources may be bundled into sets of resources or resource modules (also referred to as "pods"). Each resource module or pod may comprise a pre-integrated and optimized combination of resources of one or more types. In certain embodiments, different pods may be pre-provisioned for different types of cloud services. For example, a first set of pods may be provisioned for a database service, a second set of pods, which may include a different combination of resources than a pod in the first set of pods, may be provisioned for Java service, and the like.

For some services, the resources allocated for provisioning the services may be shared between the services.

Cloud infrastructure system 602 may itself internally use services 632 that are shared by different components of cloud infrastructure system 602 and which facilitate the provisioning of services by cloud infrastructure system 602. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 602 may comprise multiple subsystems. These subsystems may be implemented in software, or hardware, or combinations thereof. As depicted in FIG. 6, the subsystems may include a user interface subsystem 612 that enables users or customers of cloud infrastructure system 602 to interact with cloud infrastructure system 602. User interface subsystem 612 may include various different interfaces such as a web interface 614, an online store interface 616 where cloud services provided by cloud infrastructure system 602 are advertised and are purchasable by a consumer, and other interfaces 618. For example, a customer may, using a client device, request (service request 634) one or more services provided by cloud infrastructure system 602 using one or more of interfaces 614, 616, and 618. For example, a customer may access the online store, browse cloud services offered by cloud infrastructure system 602, and place a subscription order for one or more services offered by cloud infrastructure system 602 that the customer wishes to subscribe to. The service request may include information identifying the customer and one or more services that the customer desires to subscribe to. For example, a customer may place a subscription order for component based application development service offered by cloud infrastructure system 602. As part of the order, the customer may provide information identifying components to be used in developing an application.

In certain embodiments, such as the embodiment depicted in FIG. 6, cloud infrastructure system 602 may comprise an order management subsystem (OMS) 620 that is configured to process the new order. As part of this processing, OMS 620 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 620 may then invoke the order provisioning subsystem (OPS) 624 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 624 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

Cloud infrastructure system 602 may send a response or notification 644 to the requesting customer to indicate when the requested service is now ready for use. In some instances, information (e.g., a link) may be sent to the customer that enables the customer to start using and availing the benefits of the requested services. In certain embodiments, for a customer requesting component based application development service, the response may include a request for components to be self-wired or self-configured.

Cloud infrastructure system 602 may provide services to multiple customers. For each customer, cloud infrastructure system 602 is responsible for managing information related to one or more subscription orders received from the customer, maintaining customer data related to the orders, and providing the requested services to the customer. Cloud infrastructure system 602 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 602 may provide services to multiple customers in parallel. Cloud infrastructure system 602 may store information for these customers, including possibly proprietary information. In certain embodiments, cloud infrastructure system 602 comprises an identity management subsystem (IMS) 628 that is configured to manage customers information and provide the separation of the managed information such that information related to one customer is not accessible by another customer. IMS 628 may be configured to provide various security-related services such as identity services, such as information access management, authentication and authorization services, services for managing customer identities and roles and related capabilities, and the like.

Figure 7:
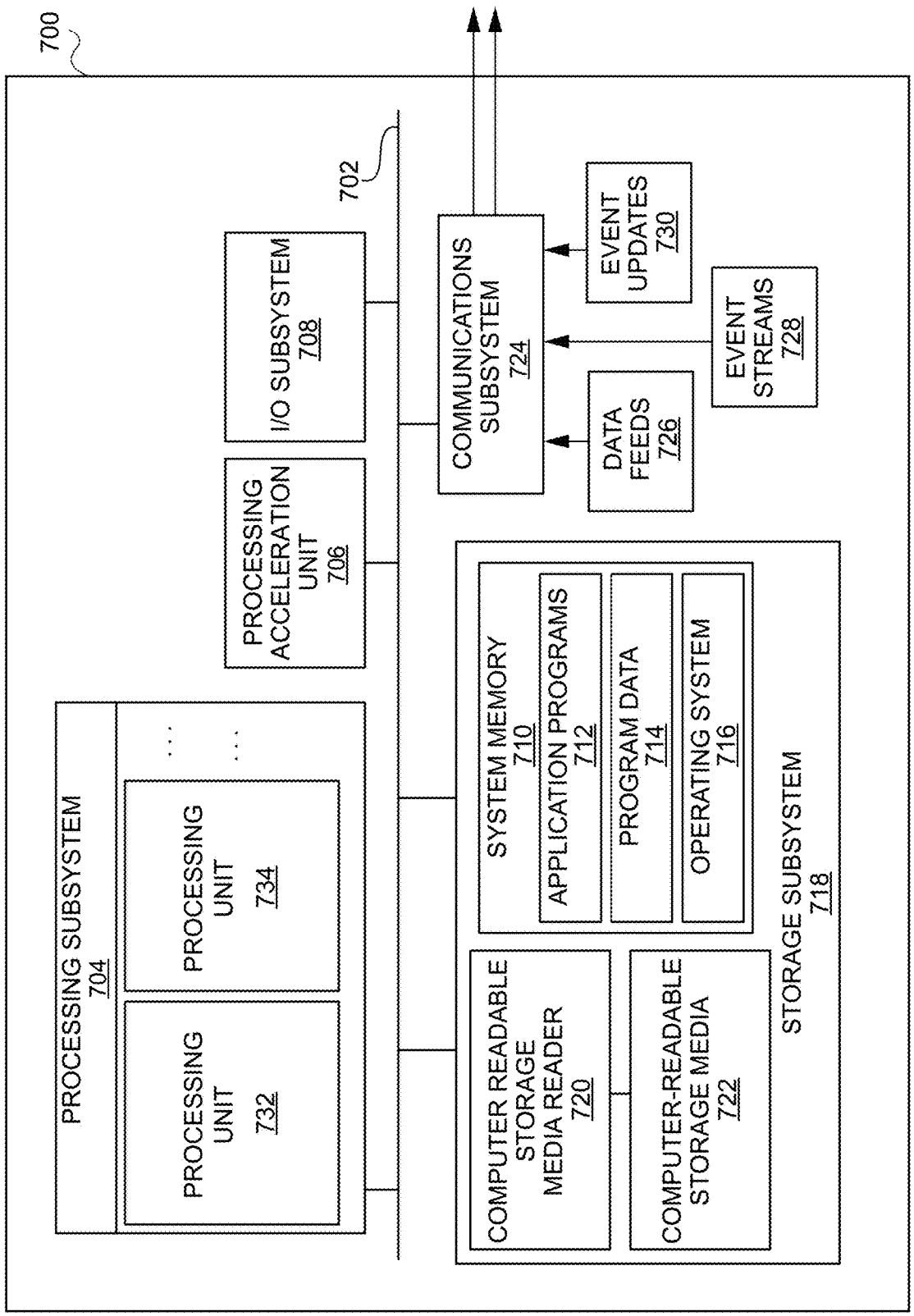
FIG. 7 illustrates an example computer system that may be used to implement various embodiments.

FIG. 7 illustrates an exemplary computer system 700 that may be used to implement certain embodiments. For example, in some embodiments, computer system 700 may be used to implement any of the component based application development processing systems and various servers and computer systems described above. As shown in FIG. 7, computer system 700 includes various subsystems including a processing subsystem 704 that communicates with a number of other subsystems via a bus subsystem 702. These other subsystems may include a processing acceleration unit 706, an I/O subsystem 708, a storage subsystem 718, and a communications subsystem 724. Storage subsystem 718 may include non-transitory computer-readable storage media including storage media 722 and a system memory 710.

Bus subsystem 702 provides a mechanism for letting the various components and subsystems of computer system 700 communicate with each other as intended. Although bus subsystem 702 is shown schematically as a single bus, alternative embodiments of the bus subsystem may utilize multiple buses. Bus subsystem 702 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 704 controls the operation of computer system 700 and may comprise one or more processors, application specific integrated circuits (ASICs), or field programmable gate arrays (FPGAs). The processors may include be single core or multicore processors. The processing resources of computer system 700 can be organized into one or more processing units 732, 734, etc. A processing unit may include one or more processors, one or more cores from the same or different processors, a combination of cores and processors, or other combinations of cores and processors. In some embodiments, processing subsystem 704 can include one or more special purpose co-processors such as graphics processors, digital signal processors (DSPs), or the like. In some embodiments, some or all of the processing units of processing subsystem 704 can be implemented using customized circuits, such as application specific integrated circuits (ASICs), or field programmable gate arrays (FPGAs).

In some embodiments, the processing units in processing subsystem 704 can execute instructions stored in system memory 710 or on computer readable storage media 722. In various embodiments, the processing units can execute a variety of programs or code instructions and can maintain multiple concurrently executing programs or processes. At any given time, some or all of the program code to be executed can be resident in system memory 710 and/or on computer-readable storage media 722 including potentially on one or more storage devices. Through suitable programming, processing subsystem 704 can provide various functionalities described above. In instances where computer system 700 is executing one or more virtual machines, one or more processing units may be allocated to each virtual machine.

In certain embodiments, a processing acceleration unit 706 may optionally be provided for performing customized processing or for off-loading some of the processing performed by processing subsystem 704 so as to accelerate the overall processing performed by computer system 700.

I/O subsystem 708 may include devices and mechanisms for inputting information to computer system 700 and/or for outputting information from or via computer system 700. In general, use of the term input device is intended to include all possible types of devices and mechanisms for inputting information to computer system 700. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google) Glass®. Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 700 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 718 provides a repository or data store for storing information and data that is used by computer system 700. Storage subsystem 718 provides a tangible non-transitory computer-readable storage medium for storing the basic programming and data constructs that provide the functionality of some embodiments. Storage subsystem 718 may store software (e.g., programs, code modules, instructions) that when executed by processing subsystem 704 provides the functionality described above. The software may be executed by one or more processing units of processing subsystem 704. Storage subsystem 718 may also provide a repository for storing data used in accordance with the teachings of this disclosure.

Storage subsystem 718 may include one or more non-transitory memory devices, including volatile and non-volatile memory devices. As shown in FIG. 7, storage subsystem 718 includes a system memory 710 and a computer-readable storage media 722. System memory 710 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 700, such as during start-up, may typically be stored in the ROM. The RAM typically contains data and/or program modules that are presently being operated and executed by processing subsystem 704. In some implementations, system memory 710 may include multiple different types of memory, such as static random access memory (SRAM), dynamic random access memory (DRAM), and the like.

By way of example, and not limitation, as depicted in FIG. 7, system memory 710 may load application programs 712 that are being executed, which may include various applications such as Web browsers, mid-tier applications, relational database management systems (RDBMS), etc., program data 714, and an operating system 716. By way of example, operating system 716 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 722 may store programming and data constructs that provide the functionality of some embodiments. Computer-readable media 722 may provide storage of computer-readable instructions, data structures, program modules, and other data for computer system 700. Software (programs, code modules, instructions) that, when executed by processing subsystem 704 provides the functionality described above, may be stored in storage subsystem 718. By way of example, computer-readable storage media 722 may include non-volatile memory such as a hard disk drive, a magnetic disk drive, an optical disk drive such as a CD ROM, DVD, a Blu-Ray® disk, or other optical media. Computer-readable storage media 722 may include, but is not limited to, Zip® drives, flash memory cards, universal serial bus (USB) flash drives, secure digital (SD) cards, DVD disks, digital video tape, and the like. Computer-readable storage media 722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 718 may also include a computer-readable storage media reader 720 that can further be connected to computer-readable storage media 722. Reader 720 may receive and be configured to read data from a memory device such as a disk, a flash drive, etc.

In certain embodiments, computer system 700 may support virtualization technologies, including but not limited to virtualization of processing and memory resources. For example, computer system 700 may provide support for executing one or more virtual machines. In certain embodiments, computer system 700 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 700. Accordingly, multiple operating systems may potentially be run concurrently by computer system 700.

Communications subsystem 724 provides an interface to other computer systems and networks. Communications subsystem 724 serves as an interface for receiving data from and transmitting data to other systems from computer system 700. For example, communications subsystem 724 may enable computer system 700 to establish a communication channel to one or more client devices via the Internet for receiving and sending information from and to the client devices. For example, the communication subsystem may be used to implement component based application development.

Communication subsystem 724 may support both wired and/or wireless communication protocols. For example, in certain embodiments, communications subsystem 724 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments communications subsystem 724 can provide wired network connectivity (e.g., Ethernet) in addition to or instead of a wireless interface.

Communication subsystem 724 can receive and transmit data in various forms. For example, in some embodiments, in addition to other forms, communications subsystem 724 may receive input communications in the form of structured and/or unstructured data feeds 726, event streams 728, event updates 730, and the like. For example, communications subsystem 724 may be configured to receive (or send) data feeds 726 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 724 may be configured to receive data in the form of continuous data streams, which may include event streams 728 of real-time events and/or event updates 730, that may be continuous or unbounded in nature with no explicit end. Examples of applications that generate continuous data may include, for example, sensor data applications, financial tickers, network performance measuring tools (e.g. network monitoring and traffic management applications), click-stream analysis tools, automobile traffic monitoring, and the like.

Communications subsystem 724 may also be configured to communicate data from computer system 700 to other computer systems or networks. The data may be communicated in various different forms such as structured and/or unstructured data feeds 726, event streams 728, event updates 730, and the like to one or more databases that may be in communication with one or more streaming data source computers coupled to computer system 700.

Computer system 700 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 700 depicted in FIG. 7 is intended only as a specific example. Many other configurations having more or fewer components than the system depicted in FIG. 7 are possible. Based on the disclosure and teachings provided herein, a person of ordinary skill in the art will appreciate other ways and/or methods to implement the various embodiments.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method comprising:
    determining, by a data processing system, an addition of one or more components to an interface of an application;
    identifying, by the data processing system, an asset definition within metadata of a component of the one or more components added to the interface of the application, wherein the asset definition provides self-wiring or self-configuring instructions for an asset that needs to be created for the component within a predefined scope when the component is added to the interface;
    determining, by the data processing system, whether the asset is defined with a context key in the asset definition:
    when the asset is defined with the context key, determining, by the data processing system, whether there is a matching context key for the interface;
    when the asset is not defined with the context key or when there is no matching context key for the interface, determining, by the data processing system, whether a requested name of the asset is already used in the predefined scope;
    when the requested name is not already used in the predefined scope, setting, by the data processing system, the requested name as an assigned name of the asset;
    when the requested name is already used in the predefined scope, generating, by the data processing system, a new name as the assigned name of the asset; and
    creating, by the data processing system, the asset for the component with the assigned name based on the asset definition.

2. The method of claim 1, wherein the self-wiring or self-configuring instructions from the component define a variable, type, action chain, or listener to be created when the component is added into the interface of the application.

3. The method of claim 1, wherein the self-wiring or self-configuring instructions from the component define a variable of type Service Data Provider to be created when the component is added into the interface of the application, and the variable needs to be created along with transformations.

4. The method of claim 1, wherein when there is a matching context key for the interface, the creating, by the data processing system, the asset comprises associating the asset with an existing asset definition linked with the context key rather than creating the asset for the component with the assigned name based on the asset definition.

5. The method of claim 1, further comprising:
    determining, by the data processing system, the addition of another component to the interface;
    identifying, by the data processing system, another asset definition within metadata of the another component added to the interface, wherein the another asset definition provides information about another asset that needs to be created for the another component;
    determining, by the data processing system, the another asset is defined with the context key in the another asset definition; and
    creating, by the data processing system, the another asset by associating the another asset with an existing asset definition linked with the context key.

6. The method of claim 1, wherein the data processing system is part of an integrated development environment, and the component is a reusable piece of UI that can be embedded as a custom HTML element in the application.

7. A system comprising:
    a data processing system that includes one or more processors and non-transitory machine readable storage medium having instructions stored thereon that when executed by the one or more processors cause the one or more processors to perform a process comprising:
    determining an addition of one or more components to an interface of an application;

identifying an asset definition within metadata of a component of the one or more components added to the interface of the application, wherein the asset definition provides self-wiring or self-configuring instructions for an asset that needs to be created for the component within a predefined scope when the component is added to the interface;

determining whether the asset is defined with a context key in the asset definition:

when the asset is defined with the context key, determining whether there is a matching context key for the interface;

when the asset is not defined with the context key or when there is no matching context key for the interface, determining whether a requested name of the asset is already used in the predefined scope;

when the requested name is not already used in the predefined scope, setting the requested name as an assigned name of the asset;

when the requested name is already used in the predefined scope, generating a new name as the assigned name of the asset; and creating the asset for the component with the assigned name based on the asset definition.

8. The system of claim 7, wherein the self-wiring or self-configuring instructions from the component define a variable, type, action chain, or listener to be created when the component is added into the interface of the application.

9. The system of claim 7, wherein the self-wiring or self-configuring instructions from the component define a variable of type Service Data Provider to be created when the component is added into the interface of the application, and the variable needs to be created along with transformations.

10. The system of claim 7, wherein when there is a matching context key for the interface, the creating, by the data processing system, the asset comprises associating the asset with an existing asset definition linked with the context key rather than creating the asset for the component with the assigned name based on the asset definition.

11. The system of claim 7, wherein the process further comprises:

determining the addition of another component to the interface;

identifying another asset definition within metadata of the another component added to the interface, where the another asset definition provides information about another asset that needs to be created for the another component;

determining the another asset is defined with the context key in the another asset definition; and creating the another asset by associating the another asset with an existing asset definition linked with the context key.

12. The system of claim 7, wherein the data processing system is part of an integrated development environment, and the component is a reusable piece of UI that can be embedded as a custom HTML element in the application.

13. A non-transitory machine readable storage medium having instructions stored thereon that when executed by one or more processors cause the one or more processors to perform a method comprising:

determining an addition of one or more components to an interface of an application;

identifying an asset definition within metadata of a component of the one or more components added to the interface of the application, wherein the asset definition provides self-wiring or self-configuring instructions for an asset that needs to be created for the component within a predefined scope when the component is added to the interface;

determining whether the asset is defined with a context key in the asset definition:

when the asset is defined with the context key, determining whether there is a matching context key for the interface;

when the asset is not defined with the context key or when there is no matching context key for the interface, determining whether a requested name of the asset is already used in the predefined scope;

when the requested name is not already used in the predefined scope, setting the requested name as an assigned name of the asset;

when the requested name is already used in the predefined scope, generating a new name as the assigned name of the asset; and creating the asset for the component with the assigned name based on the asset definition.

14. The non-transitory machine readable storage medium of claim 13, wherein the self-wiring or self-configuring instructions from the component define a variable, type, action chain, or listener to be created when the component is added into the interface of the application.

15. The non-transitory machine readable storage medium of claim 13, wherein the self-wiring or self-configuring instructions from the component define a variable of type Service Data Provider to be created when the component is added into the interface of the application, and the variable needs to be created along with transformations.

16. The non-transitory machine readable storage medium of claim 13, wherein when there is a matching context key for the interface, the creating, by the data processing system, the asset comprises associating the asset with an existing asset definition linked with the context key rather than creating the asset for the component with the assigned name based on the asset definition.

17. The non-transitory machine readable storage medium of claim 13, wherein the method further comprises:

determining the addition of another component to the interface;

identifying another asset definition within metadata of the another component added to the interface, where the another asset definition provides information about another asset that needs to be created for the another component;

determining the another asset is defined with the context key in the another asset definition; and creating the another asset by associating the another asset with an existing asset definition linked with the context key.

* * * * *

UNITED STATES PATENT AND TRADEMARK OFFICE
CERTIFICATE OF CORRECTION

PATENT NO. : 10,970,052 B2  
APPLICATION NO. : 16/206363  
DATED : April 6, 2021  
INVENTOR(S) : Mills et al.

Page 1 of 1

It is certified that error appears in the above-identified patent and that said Letters Patent is hereby corrected as shown below:

In the Specification

In Column 17, Line 7, delete "sharedDefintions.json" and insert -- sharedDefinitions.json --, therefor.

In Column 17, Line 45, delete "sharedDefintions.json" and insert -- sharedDefinitions.json --, therefor.

In Column 20, Line 17, delete "sharedDefintions.json" and insert -- sharedDefinitions.json --, therefor.

In Columns 21-22, Line 54, delete "sharedDefintions.json" and insert -- sharedDefinitions.json --, therefor.

In Column 28, Line 57, delete "assetDefintion" and insert -- assetDefinition --, therefor.

In Column 28, Line 61, delete "asset-defintion.json" and insert -- asset-definition.json --, therefor.

In Columns 29-30, Line 1, delete "asset-defintion.json" and insert -- asset-definition.json --, therefor.

In Columns 31-32, Line 1, delete "asset-defintion.json" and insert -- asset-definition.json --, therefor.

In Columns 33-34, Line 1, delete "asset-defintion.json" and insert -- asset-definition.json --, therefor.

In Column 36, Line 17, delete "asset-defintion.json" and insert -- asset-definition.json --, therefor.

In Columns 37-38, Line 1, delete "asset-defintion.json" and insert -- asset-definition.json --, therefor.

In Column 39, Line 1, delete "asset-defintion.json" and insert -- asset-definition.json --, therefor.

In Column 51, Line 67, delete "Google) Glass®." and insert -- Google Glass®). --, therefor.

Signed and Sealed this  
Third Day of August, 2021

Drew Hirshfeld  
*Performing the Functions and Duties of the*  
*Under Secretary of Commerce for Intellectual Property and*  
*Director of the United States Patent and Trademark Office*